(12) United States Patent
Rekimoto et al.

(10) Patent No.: US 7,433,651 B2
(45) Date of Patent: Oct. 7, 2008

(54) INFORMATION PROCESSING APPARATUS AND INFORMATION PROCESSING METHOD HAVING COMMUNICATION FUNCTION

(75) Inventors: Junichi Rekimoto, Tokyo (JP); Yuji Ayatsuka, Tokyo (JP); Nobuyuki Matsushita, Kanagawa (JP); Eduardo A. Sciammarella, Tokyo (JP); Haruo Oba, Kanagawa (JP)

(73) Assignee: Sony Corporation, Tokyo (JP)

( * ) Notice: Subject to any disclaimer, the term of this patent is extended or adjusted under 35 U.S.C. 154(b) by 110 days.

(21) Appl. No.: 11/403,952

(22) Filed: Apr. 14, 2006

(65) Prior Publication Data

US 2006/0194541 A1 Aug. 31, 2006

Related U.S. Application Data

(63) Continuation of application No. 10/168,637, filed as application No. PCT/JP01/09301 on Oct. 23, 2001, now Pat. No. 7,139,529.

(30) Foreign Application Priority Data

Oct. 24, 2000 (JP) ............................ P2000-324017
Jun. 19, 2001 (JP) .............................. P2001-15240

(51) Int. Cl.
*H04B 7/00* (2006.01)
*H04Q 7/00* (2006.01)

(52) U.S. Cl. .................. 455/41.3; 455/552.1; 455/553.1

(58) Field of Classification Search ................ 455/41.1, 455/41.2, 41.3, 552.1, 553.1, 426.1; 340/10.1, 340/505

See application file for complete search history.

(56) References Cited

U.S. PATENT DOCUMENTS

| 6,564,056 | B1 | 5/2003 | Fitzgerald |
| 6,697,638 | B1 | 2/2004 | Larsson et al. |
| 6,857,072 | B1 * | 2/2005 | Schuster et al. ............. 713/160 |
| 6,901,241 | B2 | 5/2005 | Bjorndahl |

FOREIGN PATENT DOCUMENTS

EP  0 756 397 A2  1/1997

(Continued)

OTHER PUBLICATIONS

Supplementary European Search Report mailed Jun. 28, 2007 in Application No. EP 01976826.6 (6 pages).

(Continued)

*Primary Examiner*—Lee Nguyen
(74) *Attorney, Agent, or Firm*—Finnegan, Henderson, Farabow, Garrett & Dunner, L.L.P.

(57) ABSTRACT

The present invention is an information processing apparatus which obtains identification information of an electronic device and makes communication with the electronic device via a network based on the identification information. When a portable telephone (11) is placed on an input display section (2) of a personal computer (1), a reader/writer built in the personal computer (1) reads a telephone number of the portable telephone (11) stored in an RF tag built in the portable telephone (11). Based on the telephone number, a telephone line is connected between the portable telephone (11) and the personal computer (1). Data is interchanged between the portable telephone (11) and the personal computer (1) via the telephone line.

8 Claims, 31 Drawing Sheets

FOREIGN PATENT DOCUMENTS

| | | |
|---|---|---|
| EP | 1 024 626 A1 | 8/2000 |
| JP | 2000-187711 | 7/2000 |
| JP | 2000-224156 | 8/2000 |
| JP | 2000-253004 | 9/2000 |
| WO | WO 99/41876 | 8/1999 |

OTHER PUBLICATIONS

Gary Legg, "Small, Rugged Memories Put Data Where It's Needed," *EDN Electrical Design News, Reed Business Information*, Highlands Ranch, Co., U.S., vol. 37, No. 17, pp. 99, 101-102, and 104 (Aug. 20, 1992).

International Search Report mailed Feb. 9, 2007 in PCT/JP01/09301 (4 pages).

International Search Report mailed Jan. 29, 2002 in PCT/JP01/09301 (1 page).

* cited by examiner

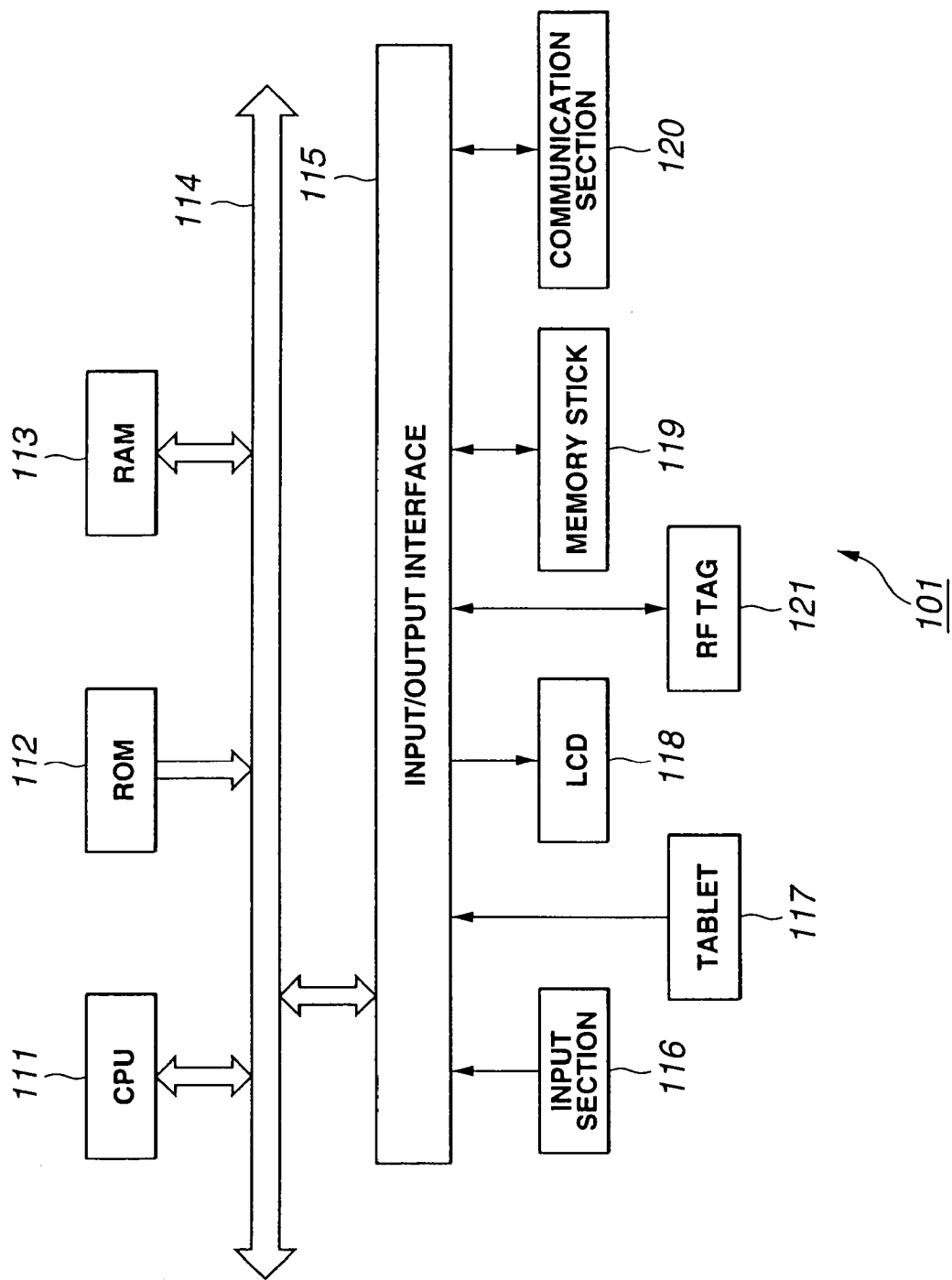

INFORMATION PROCESSING APPARATUS AND INFORMATION PROCESSING METHOD HAVING COMMUNICATION FUNCTION

This is a continuation of U.S. patent application Ser. No. 10/168,637, filed Oct. 11, 2002, now U.S. Pat. No. 7,139,529 the contents of which are incorporated herein by reference. Application Ser. No. 10/168,637 is the U.S. National Stage of International Application PCT/JP01/09301, filed Oct. 23, 2001, and claims priority to Japanese Patent Application No. P2000-324017, filed Oct. 24, 2000, and to Japanese Patent Application No. P2001-15240, filed Jun. 19, 2001.

TECHNICAL FIELD

The present invention relates to an information processing apparatus and an information processing method having a communication function and enabling information interchange and further to an electronic device, an information processing system, and a recording medium. More particularly, the present invention relates to an information processing apparatus and an information processing method for enabling easy and reliable communication between a plurality of apparatuses and further to an electronic device, an information processing system, and a recording medium.

BACKGROUND ART

Conventionally, a portable telephone, a PDA (Personal Digital Assistant), etc. are used. Users increasingly have a chance to interchange information between a plurality of these devices.

For such information interchange, devices are connected to each other via a cradle or a cable. Alternatively, infrared transceivers of the devices are faced to each other for sending and receiving information.

A cable connection is not only complicated, but also requires a connector specific to the device type, making a connection work troublesome. In the case of the infrared connection, the communication is interrupted by blocking off infrared rays when a user inadvertently crosses an infrared transmission path, for example.

To solve these problems, it is proposed to perform wireless communication between a plurality of devices by using a wireless LAN (Local Area Network), a near wireless LAN such as Bluetooth (trademark), etc.

For the wireless communication, a user must enter an address of the communication device. Normally since the user does not always remember addresses of respective devices, he or she creates, e.g., an address list and manually enters an address by referring to the list. This is inconvenient and degrades operability. When information is interchanged between a PAD owned by the user and a separate device installed before the user, he or she must enter a destination device address, making a fast information interchange difficult.

DISCLOSURE OF THE INVENTION

The present invention has been made in consideration of the foregoing. It is therefore an object of the present invention to provide an information processing apparatus and an information processing method, and further an electronic device and an information processing system capable of easily and fast interchanging information.

An information processing apparatus according to the present invention comprises: a detection means for detecting that an electronic device is closely positioned; an acquisition means for acquiring identification information of the electronic device when the detection means detects that the electronic device is closely positioned; and a communication means for communicating with the electronic device via a network based on the identification information.

The acquisition means can acquire an address of the network for the electronic device as the identification information. The present invention can further comprise a search means for searching for an address on the network for the electronic device based on the identification information obtained by the acquisition means. The acquisition means can include a reader/writer which communicates with an RF tag provided for the electronic device to obtain the identification information.

The acquisition means may communicate with the electronic device via a human body to obtain the identification information.

The present invention further comprises an execution means for executing a specified process between the apparatus and the electronic device. The execution means can send data to the electronic device or receive data sent from the electronic device.

An information processing method according to the present invention includes: a detection step for detecting that an electronic device is closely positioned; an acquisition step for acquiring identification information of the electronic device when a process at the detection step detects that the electronic device is closely positioned; and a communication step for communicating with the electronic device via a network based on the identification information.

The present invention is a recording medium which records a computer-readable program. The program recorded on this recording medium includes: a detection step for detecting that an electronic device is closely positioned; an acquisition step for acquiring identification information of the electronic device when a process at the detection step detects that the electronic device is closely positioned; and a communication step for communicating with the electronic device via a network based on the identification information.

An electronic device according to the present invention comprises: a provision means for providing its own identification information to an information processing apparatus when the device is closely positioned to the information processing apparatus; and a communication means for making communication with the information processing apparatus via a network after the provision means provides the identification information. Here, the provision means provides an address on the network as the identification information. The provision means can include an RF tag which communicates with a reader/writer provided in the information processing apparatus to provide the identification information.

The provision means can communicate with the information processing apparatus via a human body to provide the identification information.

The electronic device according to the present invention further comprises an execution means for executing a specified process between the device and the information processing apparatus. The execution means sends data to the information processing apparatus or receives data sent from the information processing apparatus.

Another information processing method according to the present invention includes: a provision step for providing its own identification information to the information processing apparatus when the device is closely positioned to the information processing apparatus; and a communication step for making communication with the information processing apparatus via a network after a step at the provision step provides the identification information.

Another recording medium according to the present invention records a computer-readable program. The recorded program includes: a provision step for providing its own identification information to the information processing apparatus when the device is closely positioned to the information processing apparatus; and a communication step for making communication with the information processing apparatus via a network after a step at the provision step provides the identification information.

An information processing system according to the present invention comprises an information processing apparatus and an electronic device. The information processing apparatus comprises: a detection means for detecting that the electronic device is closely positioned; an acquisition means for acquiring identification information of the electronic device when the detection means detects that the electronic device is closely positioned; and a first communication means for communicating with the electronic device via a network based on the identification information. The electronic device comprises: a provision means for providing its own identification information to the information processing apparatus when the device is closely positioned to the information processing apparatus; and a second communication means for making communication with the information processing apparatus via a network after the provision means provides the identification information.

Another information processing apparatus according to the present invention comprises: a first detection means for detecting that a first electronic device is closely positioned; a second detection means for detecting that a second electronic device is closely positioned; a first acquisition means for acquiring first identification information of the first electronic device when the first detection means detects that the first electronic device is closely positioned; a second acquisition means for acquiring second identification information of the second electronic device when the second detection means detects that the second electronic device is closely positioned; and a control means for controlling communication between the first and second electronic devices via a network based on the first and second identification information.

Here, the first and second acquisition means obtain an address on the network as the first or second identification information.

Another information processing apparatus according to the present invention further comprises a search means for searching for addresses on the network for the first and second electronic devices based on the first or second identification information. Here, the first and second acquisition means include reader/writers which communicate with RF tags provided for the first and second electronic devices to obtain the identification information.

Still another information processing method according to the present invention includes: a first detection step for detecting that a first electronic device is closely positioned; a second detection step for detecting that a second electronic device is closely positioned; a first acquisition step for acquiring first identification information of the first electronic device when a process at the first detection step detects that the first electronic device is closely positioned; a second acquisition step for acquiring second identification information of the second electronic device when a process at the second detection step detects that the second electronic device is closely positioned; and a control step for controlling communication between the first and second electronic devices via a network based on the first and second identification information.

Still another recording medium according to the present invention which records a computer-readable program including: a first detection step for detecting that a first electronic device is closely positioned; a second detection step for detecting that a second electronic device is closely positioned; a first acquisition step for acquiring first identification information of the first electronic device when a process at the first detection step detects that the first electronic device is closely positioned; a second acquisition step for acquiring second identification information of the second electronic device when a process at the second detection step detects that the second electronic device is closely positioned; and a control step for controlling communication between the first and second electronic devices via a network based on the first and second identification information.

According to the present invention, detecting the approach of an electronic device acquires identification information about the electronic device. Based on the identification information, a communication connection is established for interchanging data via the electronic device and a network.

According to the present invention, approaching an information processing apparatus sends identification information to the information processing apparatus. Based on this, a communication connection is established for interchanging data via the information processing apparatus and a network.

In an information processing system according to the present invention, the information processing apparatus requests a closely positioned electronic device to send its identification information. Upon reception of that request, the electronic device sends its identification information to the information processing apparatus. Based on the identification information of the electronic device, the information processing apparatus establishes a telephone communication connection between electronic devices etc. for interchanging data via a network.

When a first and a second electronic device are closely positioned in the present invention, there is acquired a plurality of first and second identification information. Based on these pieces of information, a communication connection is established between the first and second electronic devices.

The foregoing and other advantages and features of the present invention will become more apparent from the detailed description of the preferred embodiments of the present invention given below.

BRIEF DESCRIPTION OF THE DRAWINGS

FIG. 12 is a block diagram showing a configuration example of the PDA in FIG. 11;

BEST MODE FOR CARRYING OUT THE INVENTION

Figure 1:
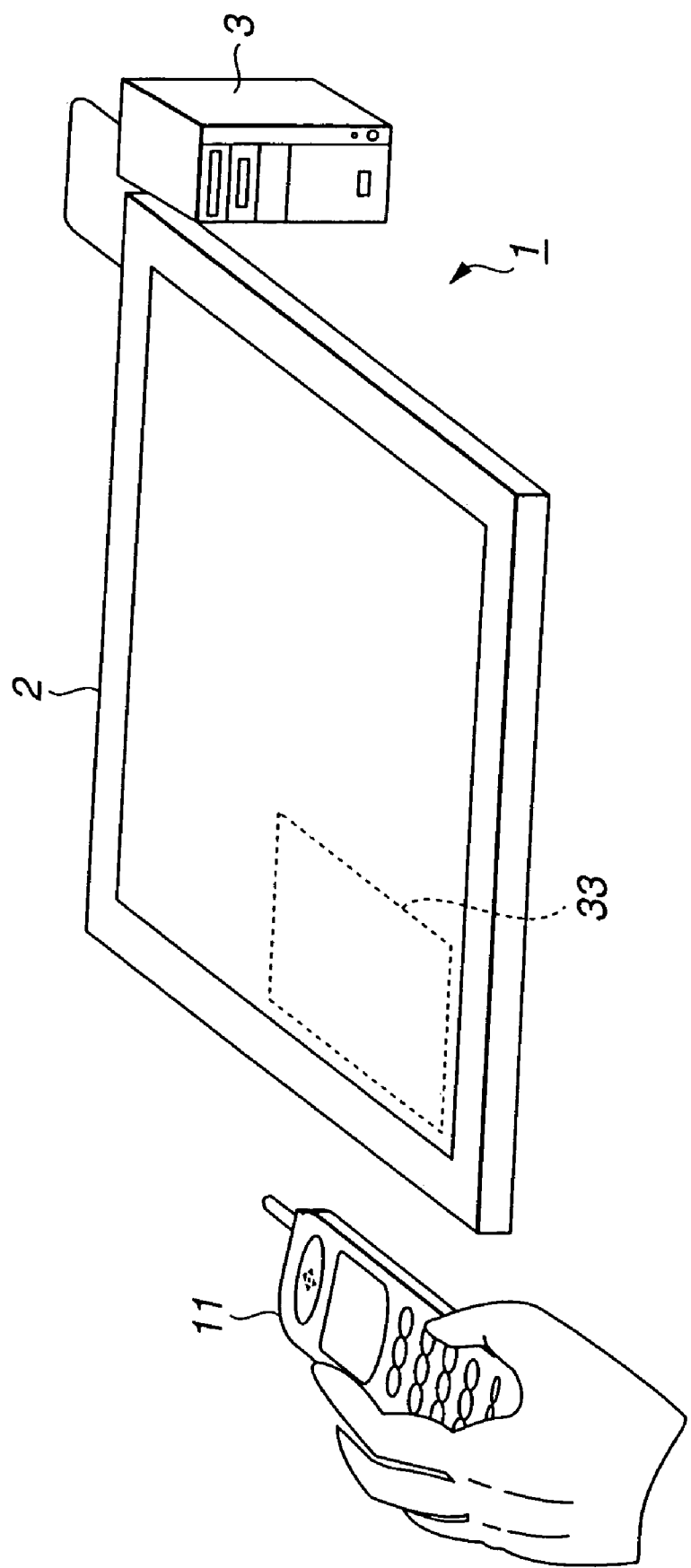
FIG. 1 shows a configuration example of an information processing system to which the present invention is applied.

An information processing system to which the present invention is applied has the configuration as shown in FIG. 1. The information processing system in FIG. 1 contains a personal computer 1 comprising an input display section 2 and a body 3 connected thereto. The input display section 2 displays specified information and allows input of specified information by means of operations of a pen (not shown) etc. thereupon.

When a user places e.g. a portable telephone 11 on the input display section 2 as needed, data can be interchanged between the portable telephone 11 and the personal computer 1.

Figure 2:
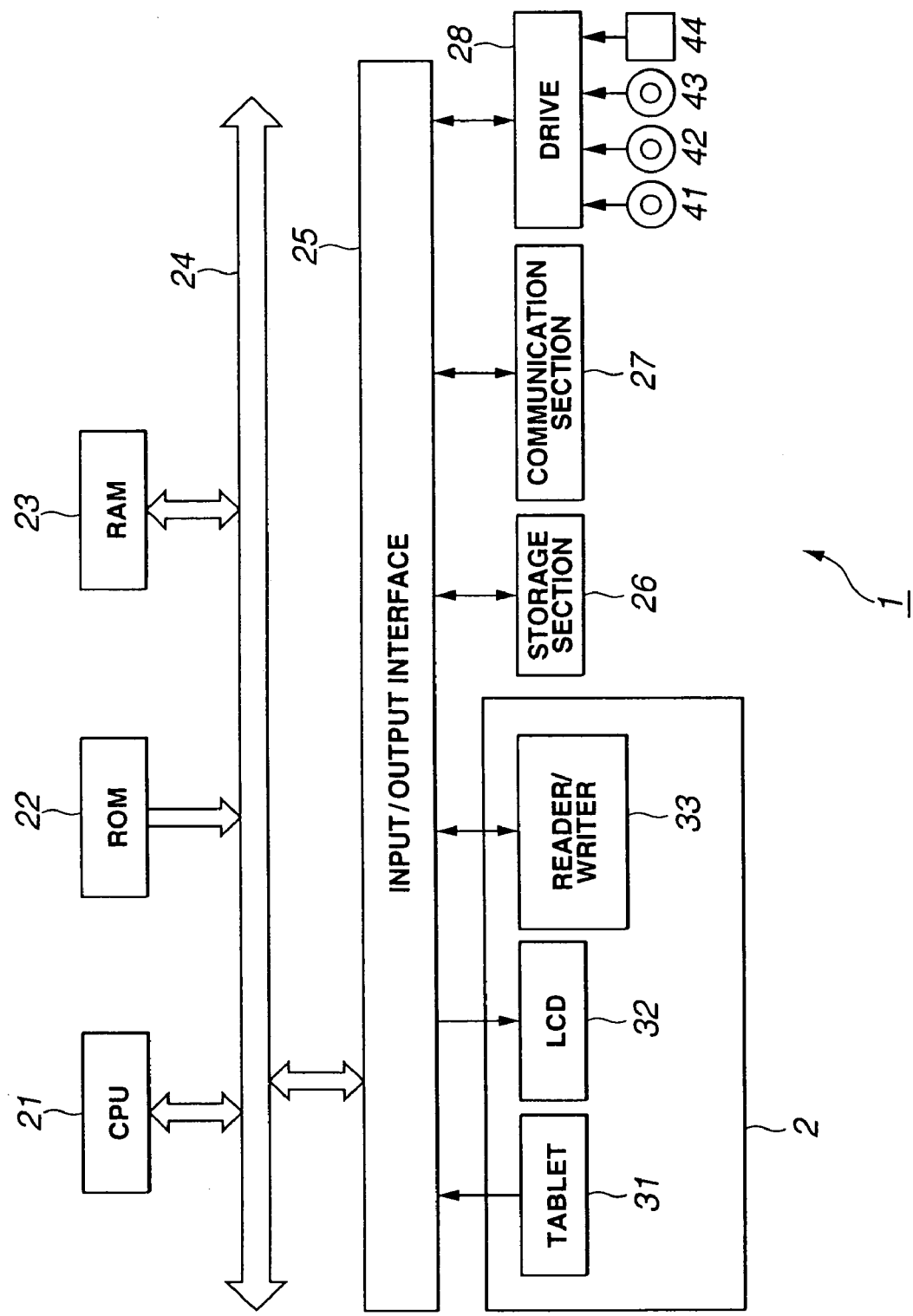
FIG. 2 is a block diagram showing a configuration example of a personal computer constituting the information processing system according to the present invention.

The personal computer 1 used here has the configuration as shown in FIG. 2. The personal computer 1 contains a CPU (Central Processing Unit) 21 which executes various processes according to a program stored in ROM (Read Only Memory) 22 or a storage section 26. RAM 23 appropriately stores programs executed by the CPU 21, data, etc. The CPU 21, the ROM 22, and the RAM 23 are connected to each other via a bus 24. The bus 24 connects with an input/output interface 25. The input/output interface 25 connects with the input display section 2, the storage section 26 comprising a hard disc, etc., and a communication section 27 communicating with the portable telephone 11, e.g., via a telephone line.

The input display section 2 is provided with a transparent tablet 31 and an LCD 32. The tablet 31 detects a user's pen operation. The LCD 32 is placed under the tablet 31 and displays images such as characters, shapes, etc. The input display section 2 is further provided with a reader/writer 33 which communicates with an RF tag 72 (see FIG. 3) for the portable telephone 11.

The input/output interface 25 further connects with a drive 28. The drive 28 is configured to appropriately install a magnetic disc 41, an optical disc 42, a magnet-optical disc 43, semiconductor memory 44, etc. A program is read from the magnetic disc 41 through the semiconductor memory 44 and is supplied to the storage section 26 from the drive 28 via the input/output interface 25.

Figure 3:
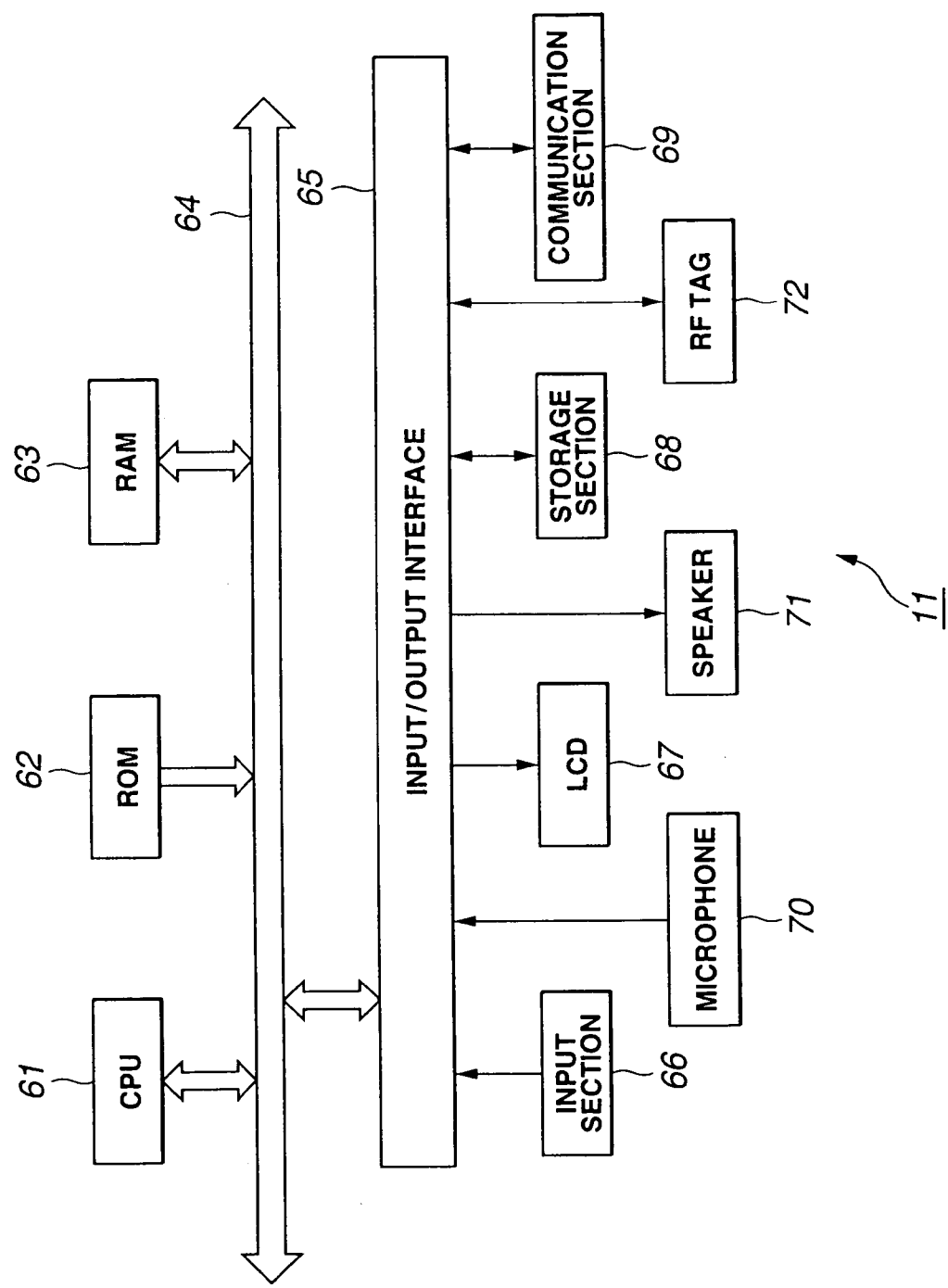
FIG. 3 is a block diagram showing a configuration example of a portable telephone constituting the information processing system according to the present invention.

FIG. 3 shows a configuration example of the portable telephone 11. A CPU 61 through an input/output interface 65 basically have the same functions as those for the CPU 21 through the input/output interface 25 for the personal computer 1 in FIG. 2, and detailed descriptions thereof are omitted.

In the portable telephone 11, an input/output interface 65 connects with an input section 66 comprising various buttons, switches, etc., and with an LCD (Liquid Crystal Display) 67 for displaying specified information. The input/output interface 65 further connects with a storage section 68 comprising semiconductor memory, etc. and a communication section 69 for performing communication via a telephone line.

A microphone 70 receives a voice signal from a user. A speaker 71 outputs a voice signal to a user. An RF tag 72 contains an IC, communicates with the reader/writer 33 of the personal computer 1, and sends an internally stored identification number of the portable telephone 11 to the reader/writer 33. The RF tag 72 has a function to store data supplied from the reader/writer 33 in built-in memory.

Figure 4:
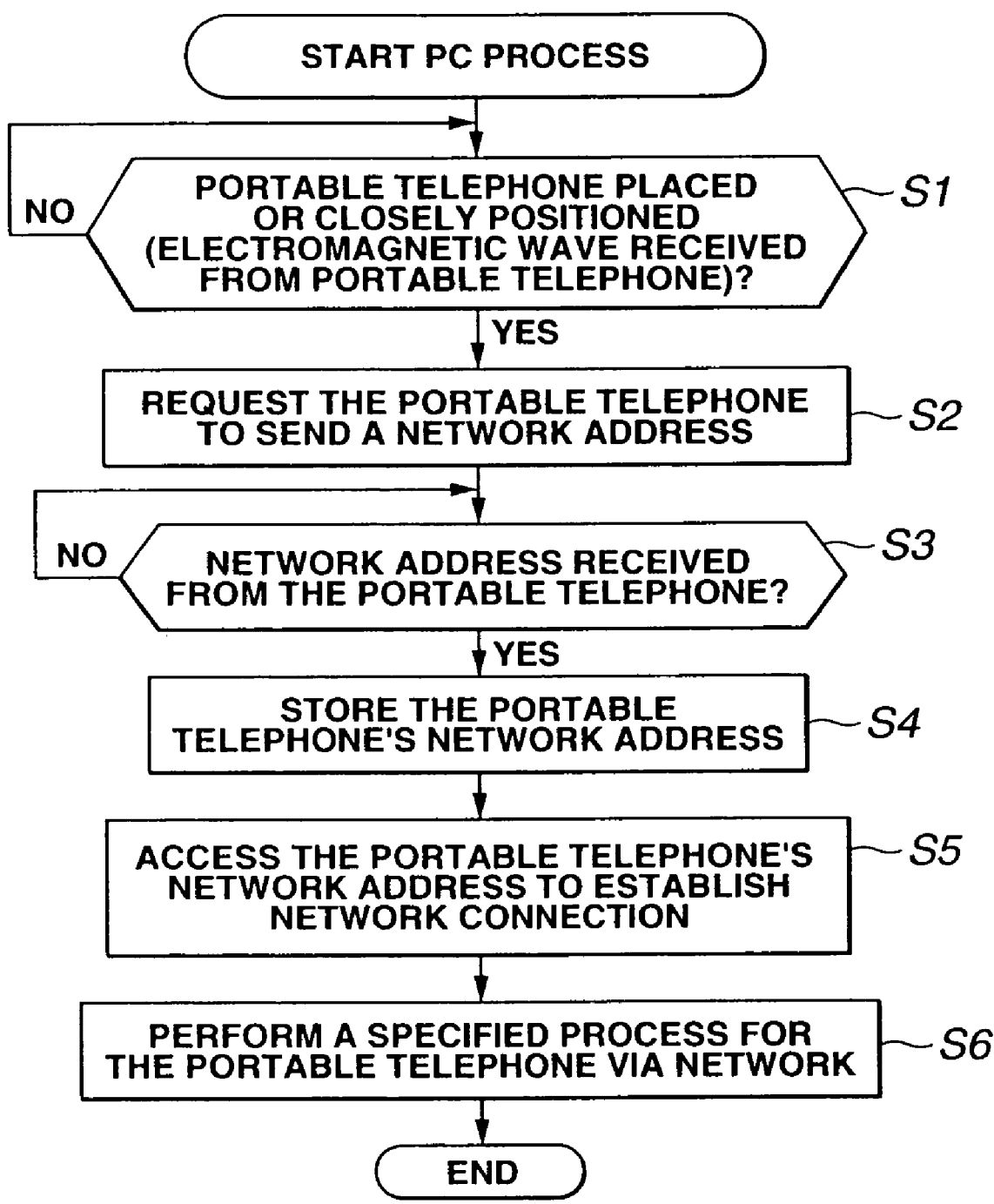
FIG. 4 is a flowchart which shows personal computer processes in the information processing system.
Figure 5:
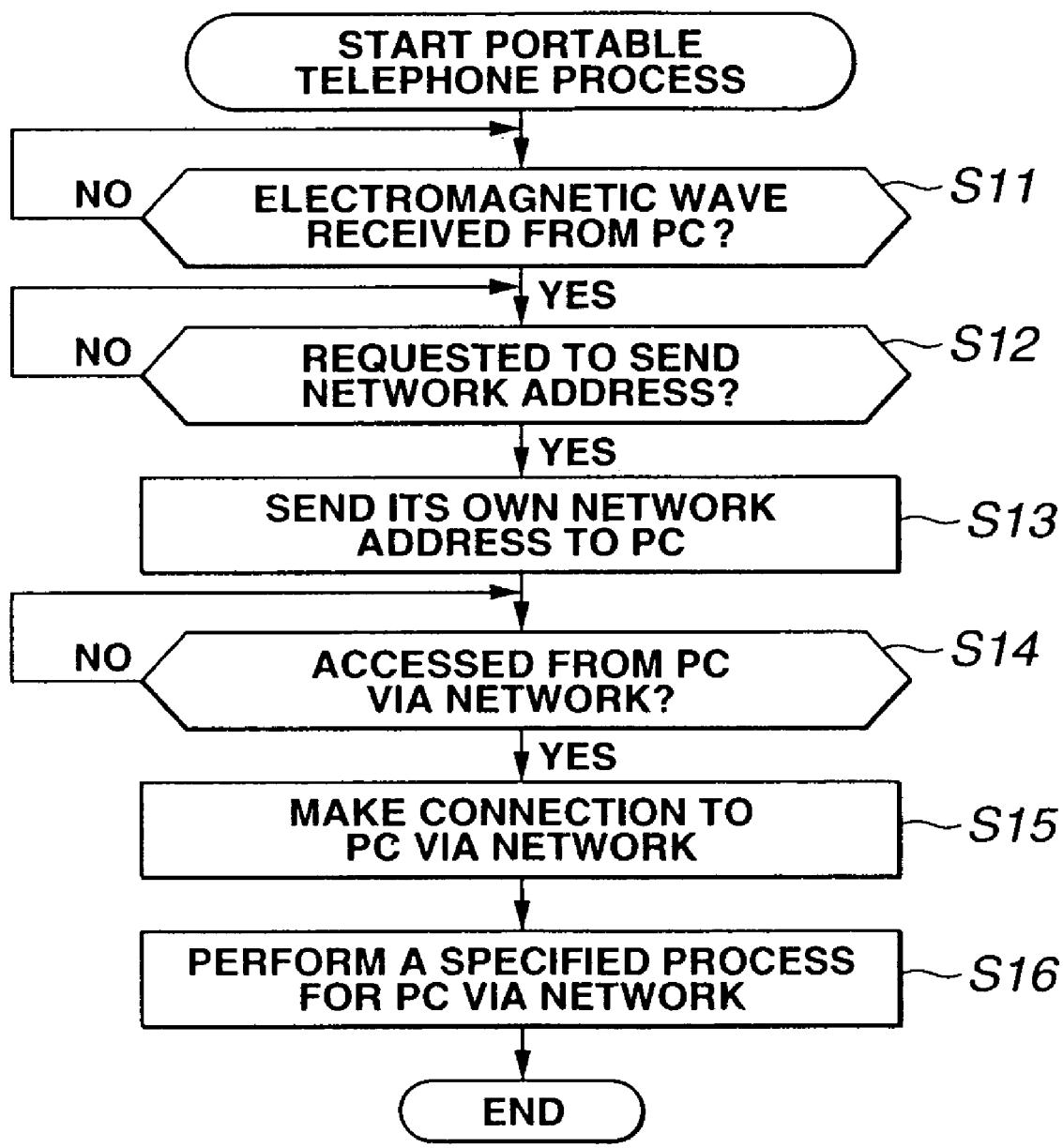
FIG. 5 is a flowchart which shows portable telephone processes in the information processing system.

The following describes operations of the personal computer 1 and the portable telephone 11 with reference to flowcharts in FIGS. 4 and 5. When a user wants to perform processing such as interchanging data between the portable telephone 11 and the personal computer 1, he or she places the portable telephone 11 on a specified position of the input display section 2. For example, this position is indicated by a dotted line in FIG. 1 where the reader/writer 33 is arranged. The user does not need to always place the portable telephone 11 on this position. He or she just needs to bring the portable telephone 11 close to the specified position of the input display section 2 so that the portable telephone 11 can receive an electromagnetic wave from the reader/writer 33.

The reader/writer 33 periodically transmits an electromagnetic wave at a sufficiently short cycle. When the portable telephone 11 is placed on the input display section 2, electromagnetic coupling occurs between the reader/writer 33 and the RF tag 72 for the portable telephone 11, changing an equivalent impedance of the antenna, in the reader/writer 33. At step S1 in FIG. 4, the reader/writer 33 monitors this impedance change to determine whether the portable telephone 11 is placed or is closely positioned, and waits until the portable telephone 11 is placed or closely positioned.

When the portable telephone 11 is placed on the reader/writer 33 or is positioned close thereto, the reader/writer 33, at step S2, requests the portable telephone 11 to send a network address. Since the network comprises a public telephone line in this case, the reader/writer 33 requests to send a telephone number of the portable telephone 11.

Based on this request, the portable telephone 11 sends the network address (telephone number). At step S3, the reader/writer 33 waits until it receives the network address from the portable telephone 11. Upon reception of the network address, the reader/writer 33 proceeds to step S4 and supplies the CPU 21 with the network address (telephone number) of the portable telephone 11. The CPU 21 supplies this telephone number to the RAM 23 for storage.

At step S5, the CPU 21 controls the communication section 27 to access the network address, stored at step S4, of the portable telephone 11 for establishing a network connection. More specifically, the communication section 27 generates a call to the telephone number stored in the RAM 23 and makes a telephone line connection between the personal computer 1 and the portable telephone 11.

Thereafter, at step S6, the personal computer 1 performs a specified process with the portable telephone 11 via the network. An example of this process will be described later.

At step S11 in FIG. 5, the RF tag 72 of the portable telephone 11 determines whether or not to receive an electromagnetic wave from the reader/writer 33 of the personal computer 1. Namely, the RF tag 72 determines whether or not the portable telephone 11 is placed on the input display section 2 of the personal computer 1 or is positioned close thereto. When it is determined that the portable telephone 11 is placed on the input display section 2 or is positioned close thereto, the process proceeds to step S12. The RF tag 72 waits until it is requested to send a network address. As mentioned above, the reader/writer 33 of the personal computer 1 requests the portable telephone 11 to transmit a network address at step S2. When it is determined that this transmission request is received, the process proceeds to step S13. The RF tag 72 reads the network address of the portable telephone 11, i.e., the telephone number in this case and sends it to the reader/writer 33. That network address (telephone number) is stored in the internal memory.

A network address can be also stored in the ROM 62 and the storage section 68. In this case, an address is read by the CPU 61 from these storage locations and is sent from the RF tag 72.

At step S14, the CPU 61 for the portable telephone 11 waits until it receives an access from the personal computer 1 by using the communication section 69 via the network. In this case, the CPU 61 waits until it is read via the telephone line.

When the communication section 69 determines at step S14 that a call is received from the communication section 27 of the personal computer 1, the process proceeds to step S15. In response to this, a connection is established between the portable telephone and the personal computer 1 via the network. In this case, the telephone line is connected.

The process then proceeds to step S16. A specified process is performed between the portable telephone 11 and the personal computer 1 via the network. This process corresponding to the process at step S6 in FIG. 4.

In the aforementioned example, the telephone number of the portable telephone 11 is sent and received as identification information. It may be preferable to send an identification number other than the telephone number of the portable telephone 11 from this telephone to the personal computer 1.

Based on that identification number, the personal computer 1 may retrieve the telephone number of the portable telephone 11 as a network address.

Figure 6:
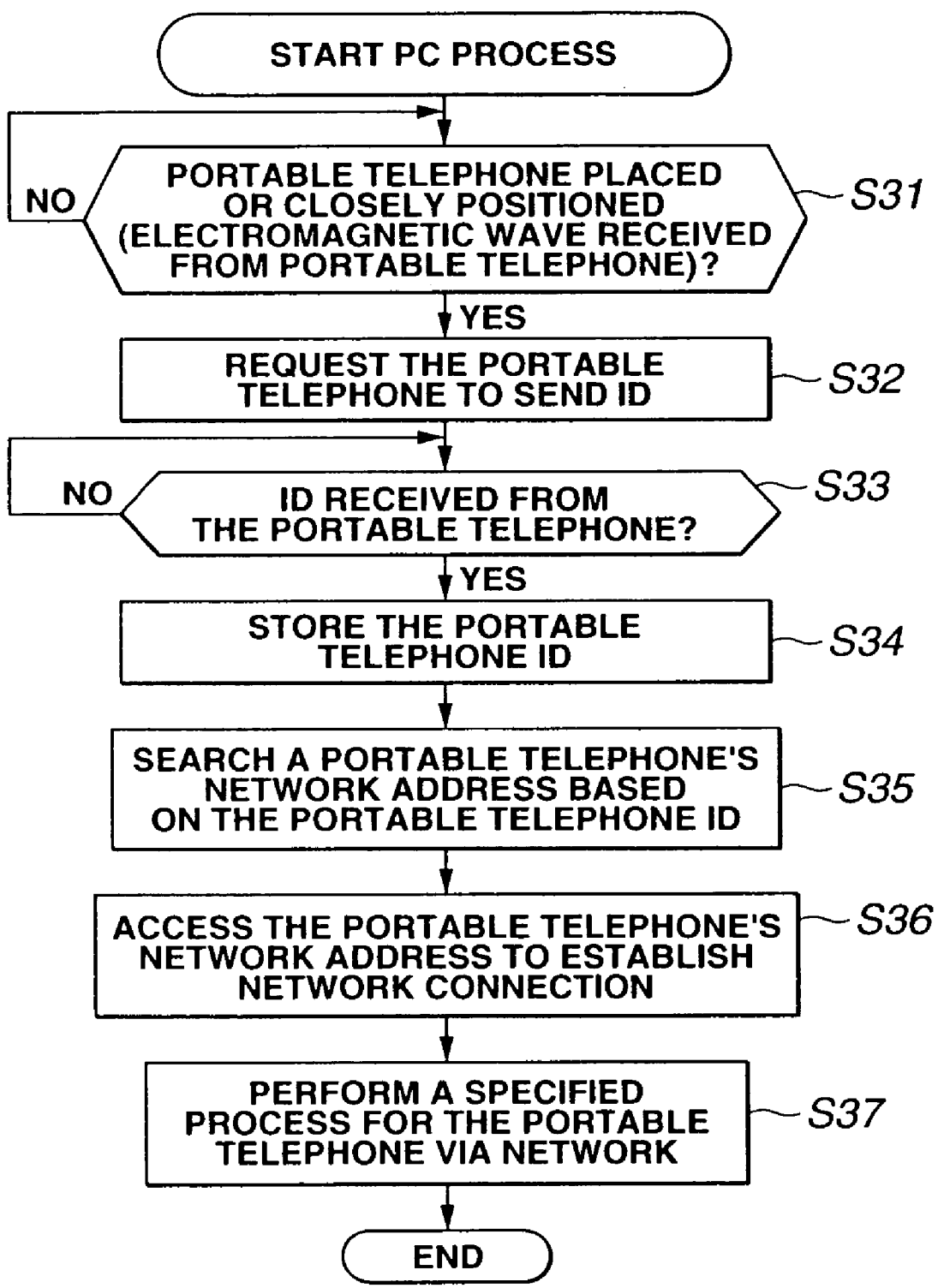
FIG. 6 is a flowchart which shows personal computer processes in the information processing system.
Figure 7:
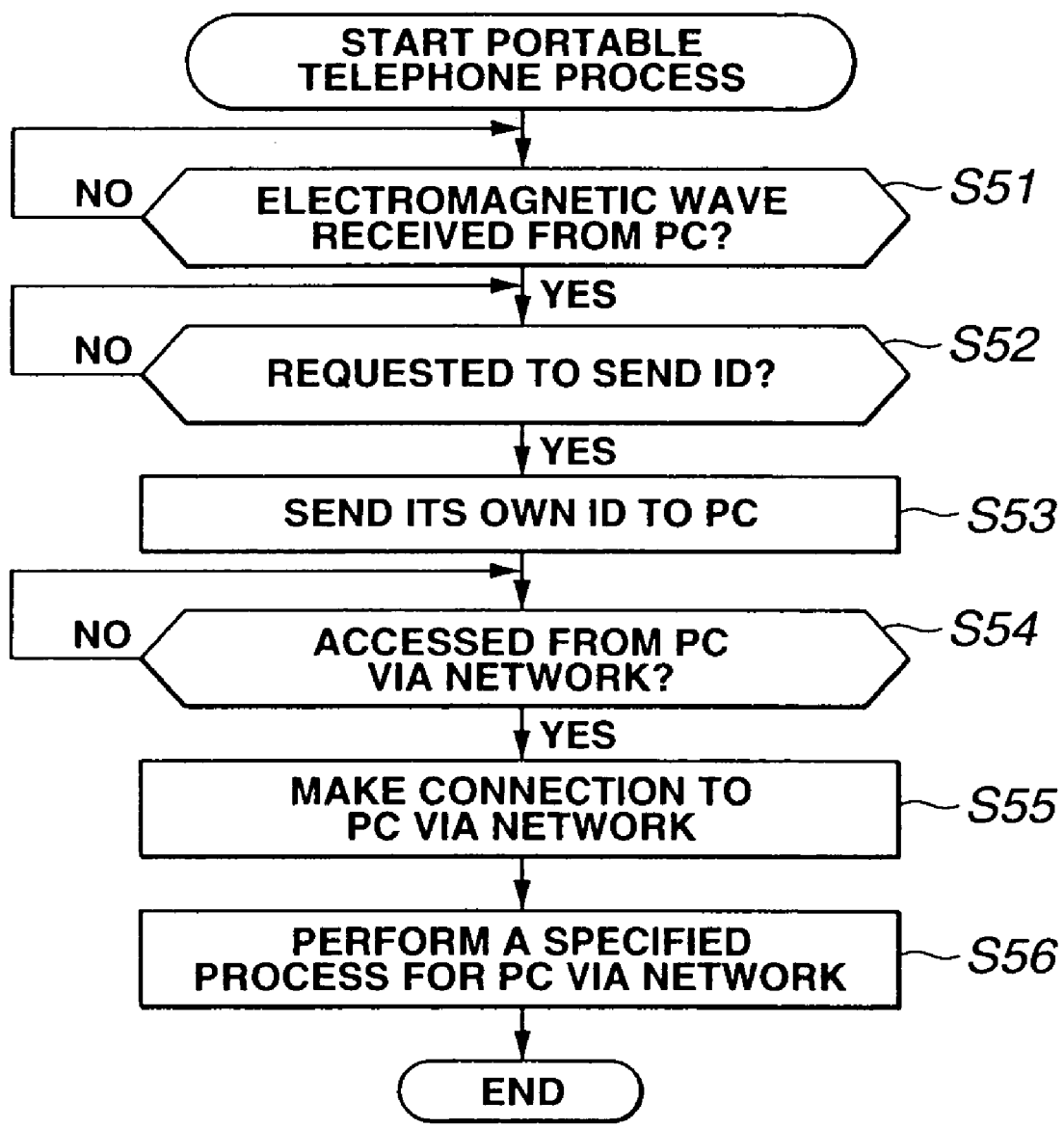
FIG. 7 is a flowchart which shows portable telephone processes in the information processing system.

FIGS. 6 and 7 describe operations of the personal computer 1 and the portable telephone 11, respectively, in this case.

Processes at steps S51 through S56 for the portable telephone 11 in FIG. 7 are basically the same as those at steps S11 through S16 in FIG. 5. A difference from FIG. 5 is that, instead of the telephone number, an identification number itself is requested from the personal computer 1 at step S52 and is transmitted at step S53. The other processes are the same as those in FIG. 5.

Likewise, processes at steps S31 through S37 in FIG. 6 for the personal computer 1 are basically the same as those at steps S1 through S6 in FIG. 4. In FIG. 6, however, the portable telephone 11 sends an identification number, not the telephone number. At step S34, the CPU 21 of the personal computer 1 stores the identification number for the portable telephone 11 in the RAM 23. Then, at step S35, the CPU 21 retrieves the telephone number as a network address based on the identification number for the portable telephone 11. For this retrieval, it may be preferable to use the storage section 26 to previously store a table for correspondence between identification numbers and telephone numbers for the portable telephone 11. The communication section 27 may access a specified server e.g. via the Internet, etc. to retrieve a telephone number corresponding to the identification number for the portable telephone 11 via the server.

After the telephone number for the portable telephone 11 is retrieved, subsequent processes are the same as those in FIG. 4.

The following further describes an example of processes at step S6 in FIG. 4 (step S37 in FIG. 6) and at step S16 in FIG. 5 (step S56 in FIG. 7).

Figure 8:
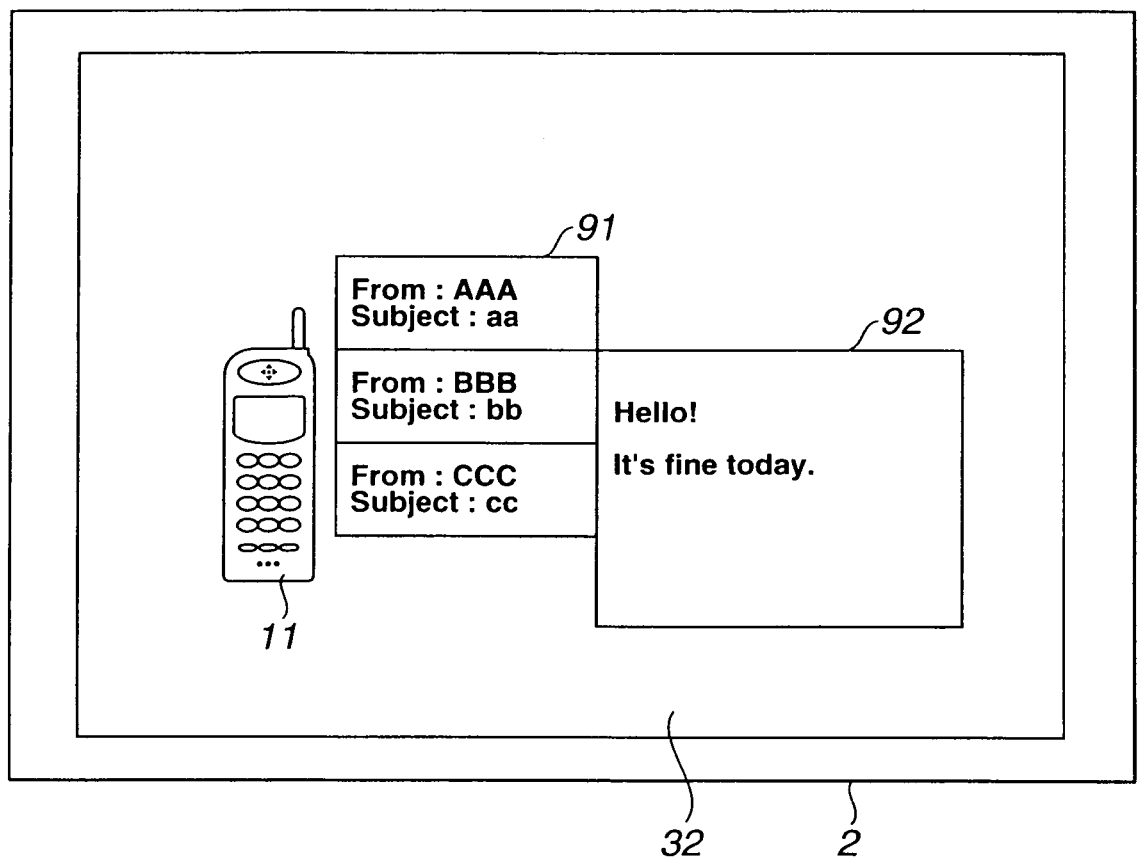
FIG. 8 shows data interchange between the portable telephone and the personal computer.

FIG. 8 shows an example of placing the portable telephone 11 on the input display section 2 or positioning it close thereto. In this example, the LCD 32 of the input display section 2 is used to display the content of mail registered in the portable telephone 11 with an enlarged display size.

Figure 9:
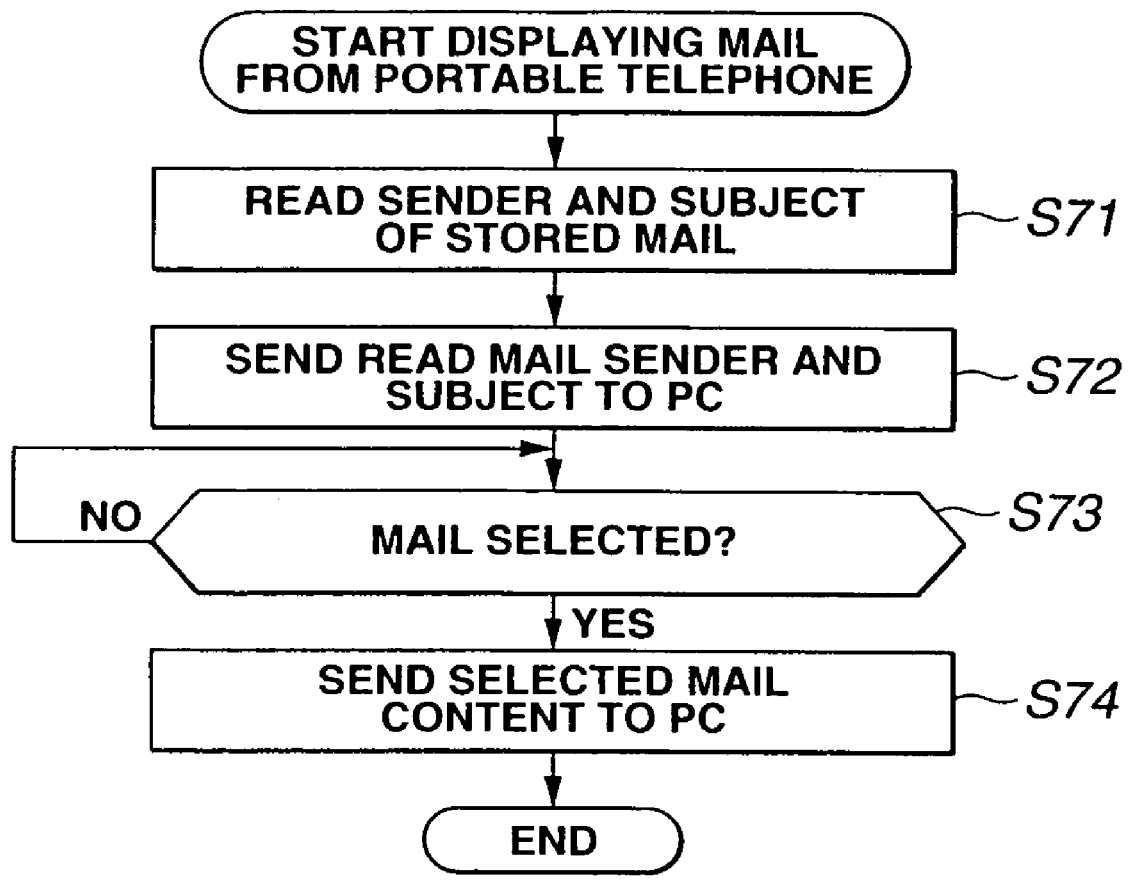
FIG. 9 is a flowchart which shows processes of the portable telephone in FIG. 8.

Hereinafter, processes for the portable telephone 11 and the personal computer 1 are described with reference to flowcharts in FIGS. 9 and 10.

At step S71, the CPU 61 of the portable telephone 11 reads senders and subjects of so far received mail messages stored in the RAM 63. At step S72, the CPU 61 sends senders and subjects of the read mail to the personal computer 1. Namely, at this time, the CPU 61 controls the communication section 69 to transmit these senders and subjects to the personal computer 1 via the telephone line.

As will be described later, the transmitted mail senders and subjects are displayed on the LCD 32 of the personal computer 1. When the user selects a specified mail message out of the displayed ones, the selected mail message is transmitted to the portable telephone 11.

At step S73, the CPU 61 waits until selection of the mail is notified. When the mail selection is notified, the process proceeds to step S74. The CPU 61 reads the content of the selected mail from the RAM 63 and allows the communication section 69 to transmit that content to the personal computer 1.

Figure 10:
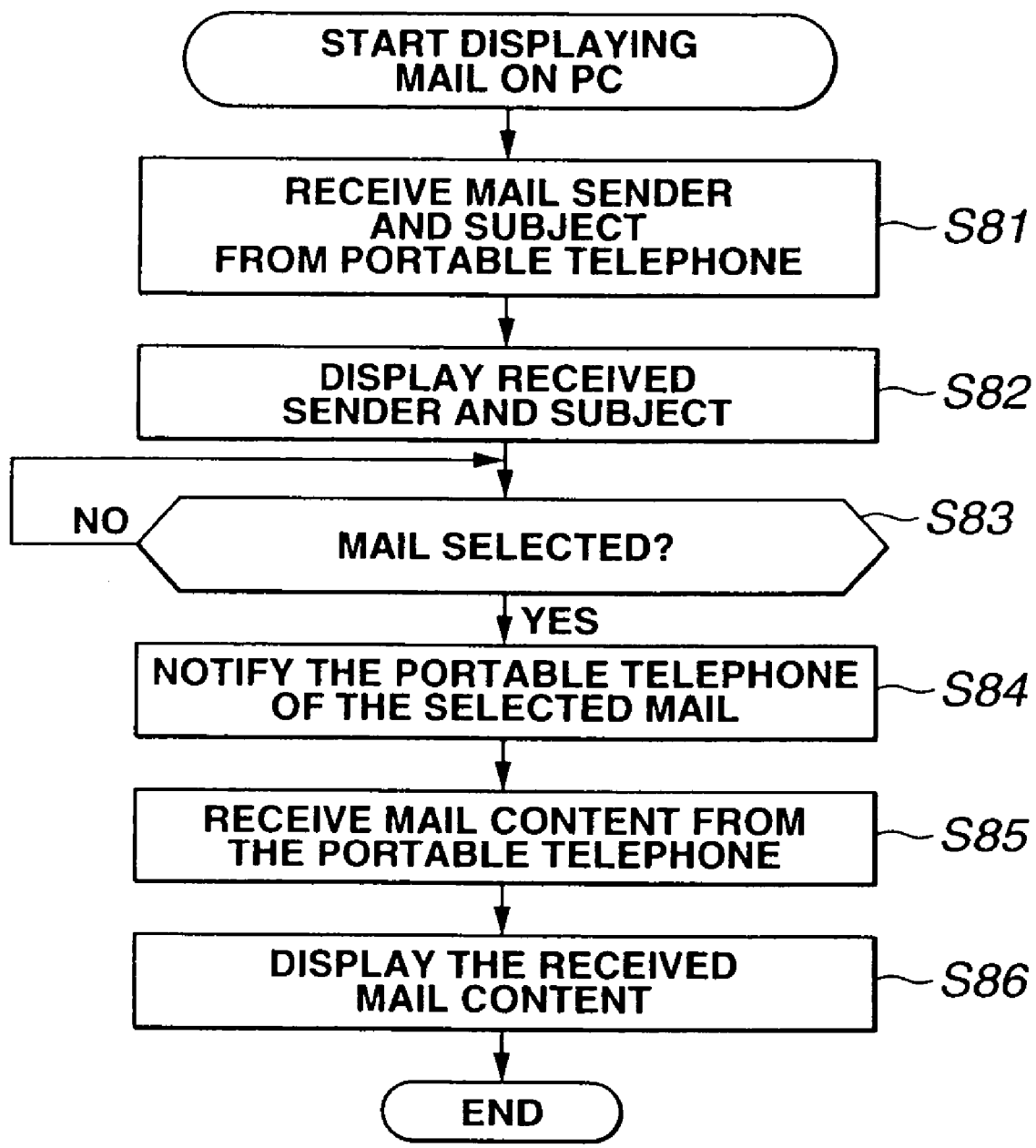
FIG. 10 is a flowchart which shows processes of the personal computer in FIG. 8.

In response to this process of the portable telephone 11, the personal computer 1 performs the process as shown in the flowchart of FIG. 10.

At step S81, the CPU 21 receives the mail senders and subjects if they are transmitted from the portable telephone 11. Namely, when the mail senders and subjects are transmitted from the communication section 69 of the portable telephone 11 via the telephone line, the communication section 27 receives them and supplies them to the RAM 23 for storage. At step S82, the CPU 21 reads the senders and subjects stored in the RAM 23 and outputs them to the LCD 32 for display. In this manner, as shown in FIG. 8 for example, a window 91 displays the mail senders and subjects transmitted from the portable telephone 11.

Viewing this display, the user operates a pen to select a mail message by selecting the sender or the subject of one mail message in the window 91. At step S83, the CPU 21 waits until a mail message is selected. When the mail message is selected, the process proceeds to step S84. The CPU 21 notifies the portable telephone 11 of the selected mail message. Namely, at this time, the CPU 21 controls the communication section 27 to notify the portable telephone 11 of the mail message specified (selected) by the user via the telephone line.

When the selected mail message is notified, the portable telephone 11 transmits the content of the selected mail message as mentioned above. At step S85, the communication section 27 receives the mail content transmitted from the portable telephone 11. This mail content is temporarily supplied to the RAM 23 for storage. At step S86, the CPU 21 reads the mail content stored in the RAM 23. The CPU 21 outputs and displays the mail content at the right of the position where the portable telephone 11 is placed on the LCD 32 or at a position specified by the user with the pen, i.e., detected from an output of the tablet 31. In this manner, as shown in FIG. 8 for example, the window 92 displays the selected mail content. In the example of FIG. 8, the second mail message is selected in the window 91, showing that the sender is BBB, the subject is bb, and the content is "Hello! It's fine today".

Theoretically, it is possible to interchange mail data by means of communication between the RF tag 72 and the reader/writer 33. Since this communication permits just a small transmission capacity, however, it is used only for transmission of the identification information.

FIG. 11 shows another example of data transferred to/from the personal computer 1 via the telephone line. In this example, a PDA 101 instead of the portable telephone 11 is placed on or is positioned close to the input display section 2. Image data stored in the PDA 101 is transferred to the personal computer 1.

For example, the PDA 101 is configured as shown in FIG. 12

A CPU 111 through an input/output interface 115 have the same functions as those for the CPU 21 through the input/output interface 25 of the personal computer 1 in FIG. 2.

An input section 116 comprises button, switches, etc. and is operated by the user for entering specified instructions. A tablet 127 comprises a transparent member and detects an input generated when the user operates a pen (not shown), etc. An LCD 118 is arranged under The tablet 117 and displays characters, shapes, etc.

Plate-shaped IC memory 119 contains semiconductor memory and can be attached or detached from the PDA 101. Here, a memory stick 119 is used as the IC memory and appropriately stores text data or image data. A communication section 120 communicates with other apparatuses via the telephone line.

An RF tag 121 internally stores a telephone number (or identification number) of the PDA 101. The RF tag 121 may be replaced by ROM 112 or the memory stick 119.

Figure 11C:
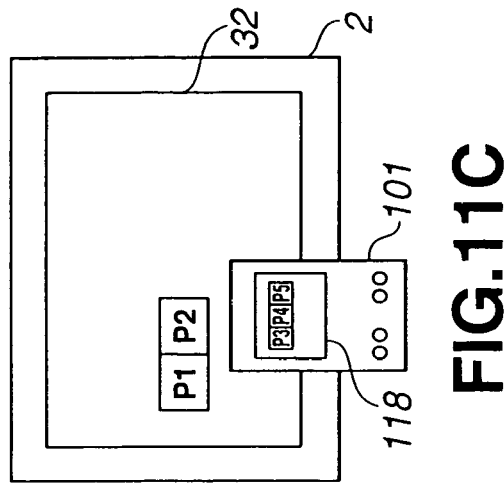
FIGS. 11A through 11F show examples of data interchange between a PDA and the personal computer.
Figure 11F:
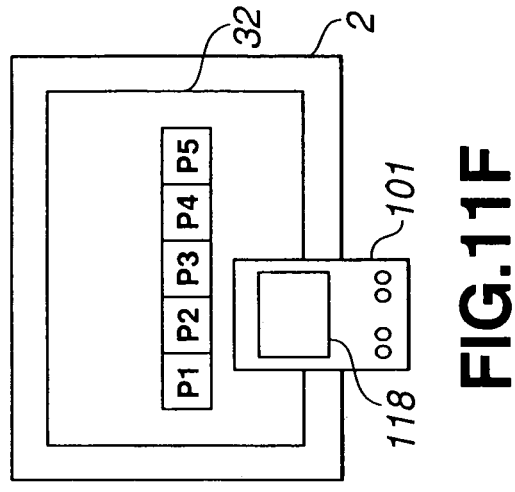
Figure 11B:
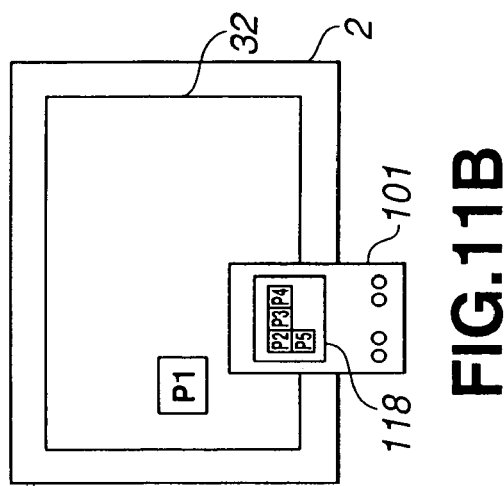
Figure 11E:
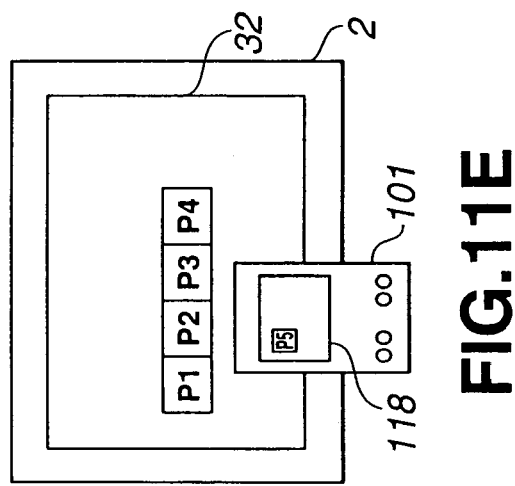
Figure 11A:
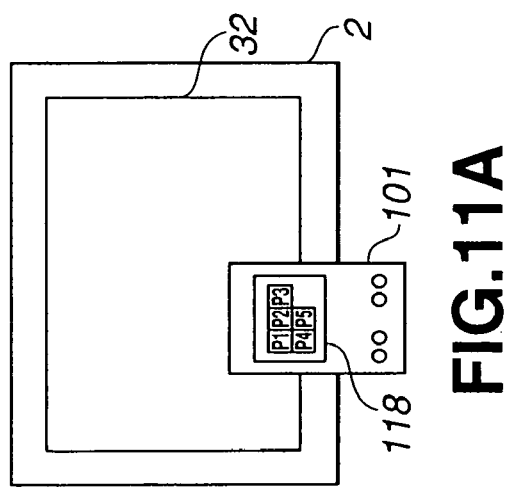
Figure 11D:
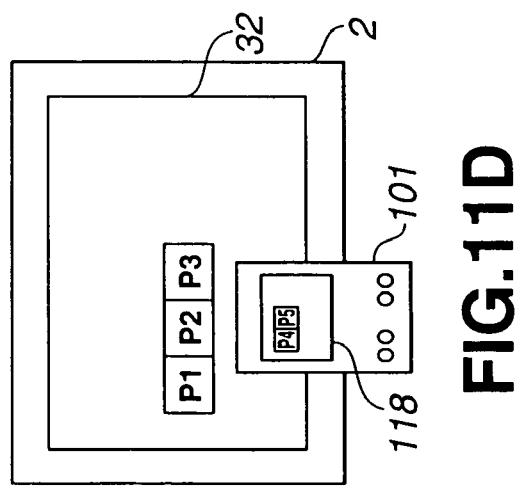
Figure 13:
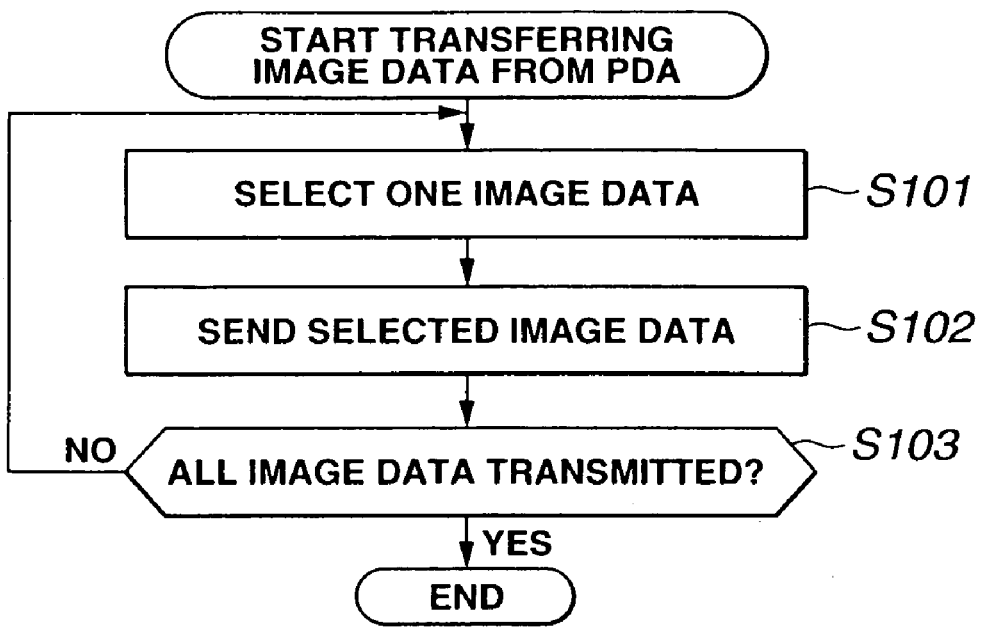
FIG. 13 is a flowchart which shows processes of the PDA in FIG. 11.
Figure 14:
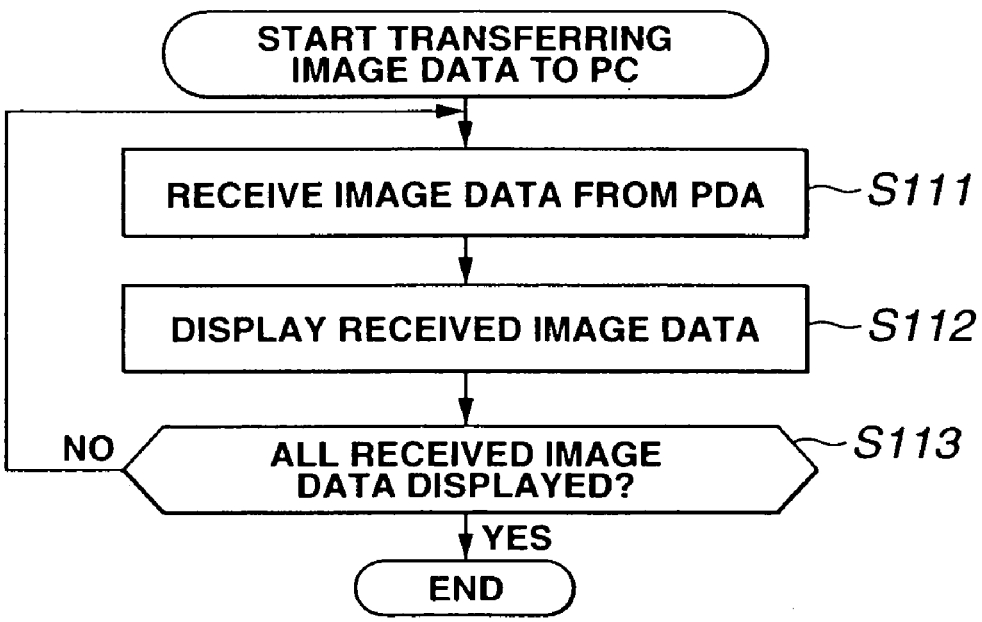
FIG. 14 is a flowchart which shows operations of the personal computer in FIG. 11.

Referring now to flowcharts in FIGS. 13 and 14, the following describes an example of processing performed when the PDA 101 is placed on the input display section 2 of the personal computer 1 as shown in FIG. 11A.

As mentioned above, when the PDA 101 is placed on the input display section 2 of the personal computer 1, the telephone line is connected between the personal computer 1 and the PDA 101.

When the user instructs transfer of an image, the CPU 111 of the PDA 101 selects one of image data previously stored in the memory stick 119 at step S101 in FIG. 13. At step S102, the CPU 111 controls the communication section 120 to transmit the selected image data to the personal computer 1 via the telephone line.

At step S103, the CPU 111 determines whether or not all image data is transmitted. When image data remains being unsent, the CPU 111 returns to step S101 and repeatedly performs the subsequent process.

When it is determined that all image data is transmitted at step S103, the process terminates.

Incidentally, the personal computer 1 performs the process as shown in the flowchart of FIG. 14. When image data is transmitted from the PDA 101 via the telephone line, the CPU 21 receives the data via the communication section 27 at step S111 and supplies the data to the RAM 23 for temporary storage. At step S112, the CPU 21 reads the imaged data stored in the RAM 23 and outputs it to the LCD 32 for display.

As shown in FIG. 11A, for example, the PDA 101 stores five images P1 through P5. As shown in FIG. 11B, one image P1 is transferred from the PDA 101 to the personal computer 1. This image is stored in the RAM 23 and is displayed on the LCD 32. According to the example in FIG. 11B, the image is displayed at the upper left of the PDA 101. The image can be displayed at a position specified by the pen. At this time, the transferred image disappears from the LCD 118 of the PDA 101. The example in FIG. 11B shows the transfer of one image P1 out of five images P1 through P5 in FIG. 11A. The LCD 118 of the PDA 101 displays four images P2 through P5.

At step S113, the CPU 21 determines whether or not all the received image data are displayed. When image data remains being undisplayed, the CPU 21 returns to step S111 and repeatedly performs the aforementioned process. When it is determined that all the received image data are displayed, the process terminates.

As shown in FIGS. 11C through 11F, images are sequentially transferred from the PDA 101 to the personal computer 1 in the order of P2, P3, P4, and P5 and are stored in the RAM 23. In accordance with this transfer, the LCD 32 sequentially displays images P2 through P5. As images are displayed in this manner, transferred images are sequentially deleted from the LCD 118 of the PDA 101.

Figure 15:
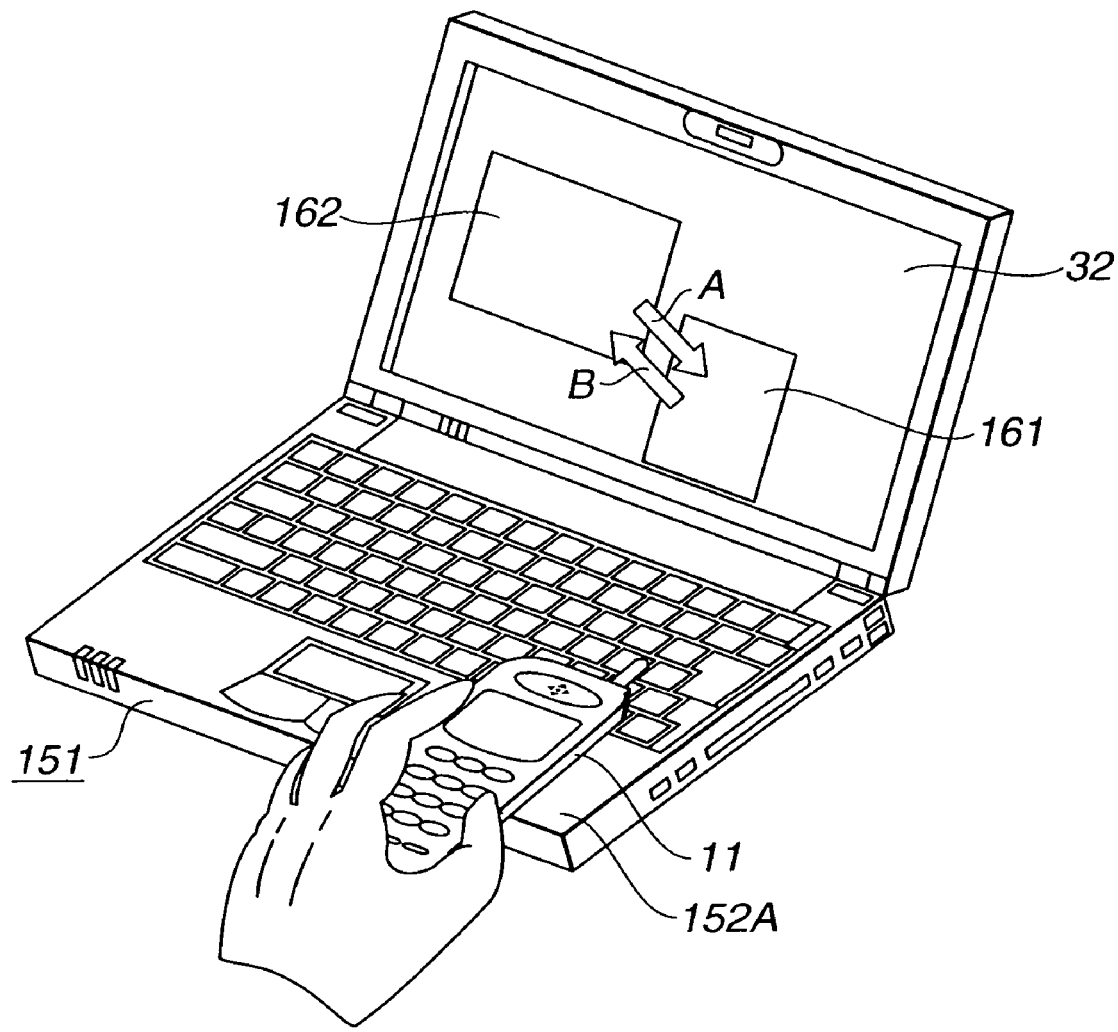
FIG. 15 shows an example of transferring information between the portable telephone and the personal computer.

FIG. 15 shows another example of interchanging information. In this example, the personal computer is replaced by a notebook computer. The reader/writer 33 of the personal computer 1 in FIG. 2 is arranged to the bottom of a palm rest 152A on this personal computer 151. The internal structure of the personal computer 151 is the same as that shown in FIG. 2, and its specific illustration is omitted.

Hereinafter, processes for the personal computer 151 and the portable telephone 11 in this case are described with reference to flowcharts in FIGS. 16 and 17. The configuration of the personal computer 1 in FIG. 2 is used as is for that of the personal computer 151. Also in this case, placing the portable telephone 11 on the palm rest 152A of the personal computer 151 connects the telephone line between the portable telephone 11 and the personal computer 151 as mentioned above.

Figure 16:
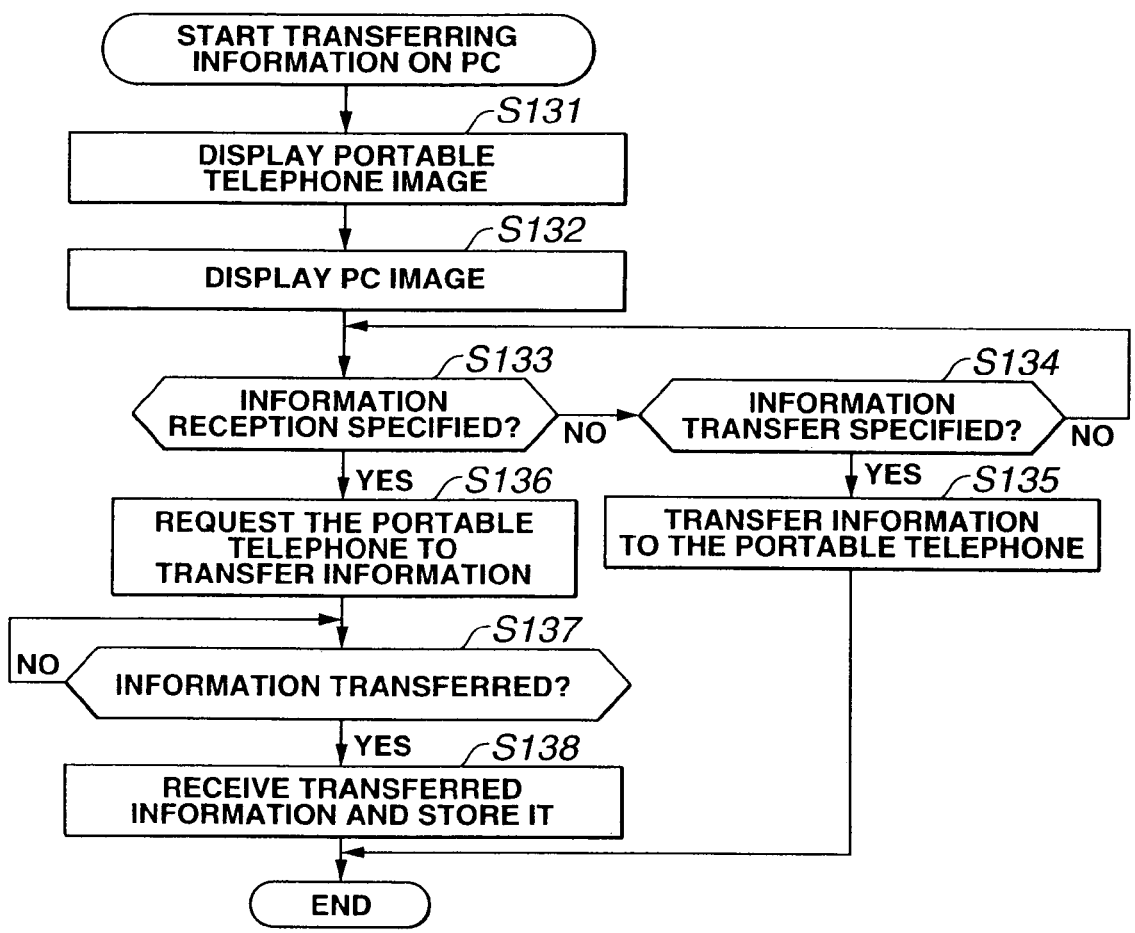
FIG. 16 is a flowchart which shows operations of the personal computer in FIG. 15.

At step S131 in FIG. 16, the CPU 21 of the personal computer 151 displays an image representing the portable telephone 11 on the LCD 32. In the example of FIG. 15, an image 161 is displayed as the image of the portable telephone 11. This image 161 is displayed to the right of the LCD 32 when the portable telephone 11 is placed to the right of the palm rest 152A. It is displayed to the left of the LCD 32 when the portable telephone 11 is placed to the left of the palm rest 152A.

At step S132, the CPU 21 displays an image 162 in FIG. 15 on the LCD 32 as an image representing the personal computer 1.

At step S133, the CPU 21 determines whether or not the user specifies information reception. When it is determined that no information reception is specified, the CPU 21 proceeds to step S134 to determine whether or not information transfer is specified. When it is determined that no information transfer is specified either, the CPU 21 returns to step S133 ands repeatedly performs the subsequent process.

When it is determined that the user specifies information transfer at step S134, the process proceeds to step S135. The CPU 21 performs a process for transferring information to the portable telephone 11.

On the LCD 32 in FIG. 15, for example, the user can specify information transfer by performing a drag-and-drop operation from the image 162 for the personal computer 151 to the image 161 for the portable telephone 11 in the direction of an arrow A. In this case, the CPU 21 transfers specified data stored in the RAM 23 from the communication section 27 to the portable telephone 11 via the telephone line.

When it is determined at step S133 that information reception is specified, the process proceeds to step S136. The CPU 21 requests the portable telephone 11 to transfer information.

Namely, in FIG. 15, the user can specify information transfer from the portable telephone 11 to the personal computer 151 by performing a drag-and-drop operation from the image 161 to the image 162 in the direction of an arrow B. In this case, the CPU 21 controls the communication section 27 to request the portable telephone 11 to transfer information via the telephone line.

When requested for information transfer, the portable telephone 11 transfers information as will be described later. At step S137, the CPU 21 waits until information is transferred. When information is transferred, the process proceeds to step S138. The CPU 21 receives the transferred information via the communication section 27 and stores the information in the RAM 23.

Figure 17:
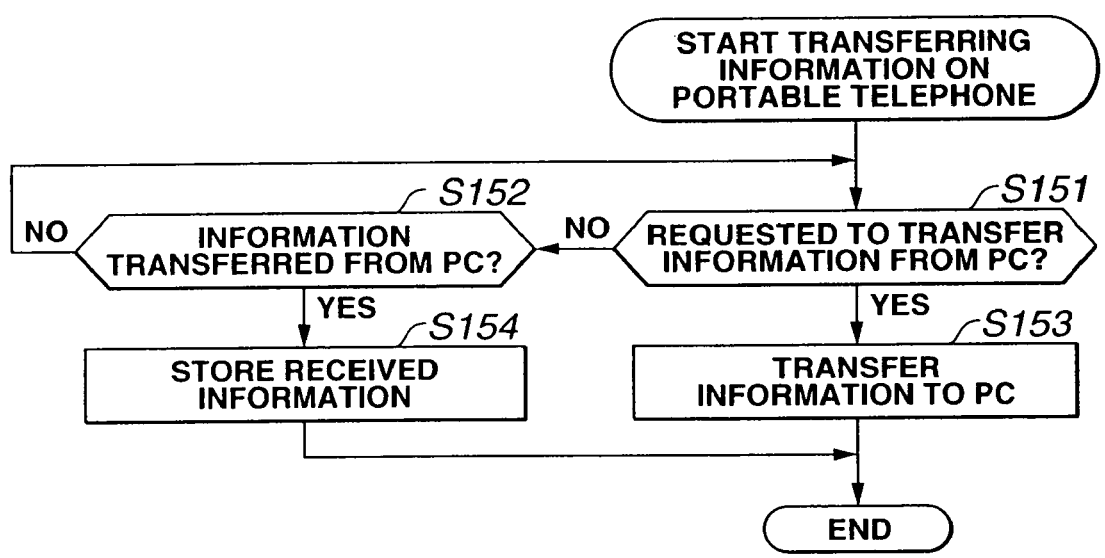
FIG. 17 is a flowchart which shows operations of the portable telephone in FIG. 15.

The portable telephone 11 performs the process as shown in the flowchart of FIG. 17 in response to the aforementioned operations of the personal computer 151. At step S151, the CPU 61 determines whether or not a request for information transfer is received from the personal computer 151. When such request is not received, the process proceeds to step S152. The CPU 61 determines whether or not information is transferred from the personal computer 151. When no information is transferred, the CPU 61 returns to step S151 and repeatedly performs the subsequent process.

When it is determined at step S151 that a request for information transfer is received from the personal computer 151, the CPU 61 proceeds to step S153. The CPU 61 then reads information stored in the RAM 63 and transfers the information to the personal computer 151 from the communication section 69 via the telephone line.

When it is determined at step S152 that information is transferred from the personal computer 151, the CPU 61 proceeds to step S154. The CPU 61 then supplies the information received at the communication section 69 via the telephone line to the RAM 63 for storage.

Figure 18:
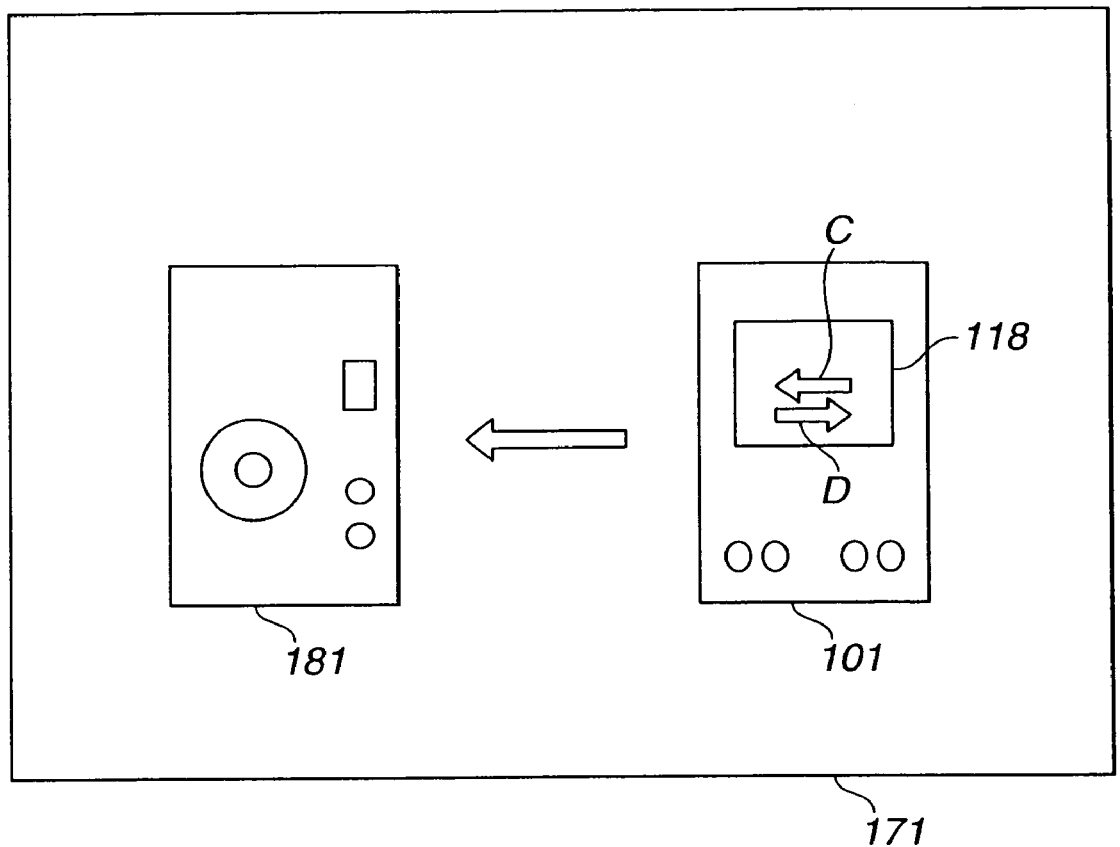
FIG. 18 shows an example of a connection board.

FIG. 18 shows an example of a connection board. When two electronic devices are placed on a connection board 171, the telephone line is connected between the two devices, allowing data to be interchanged via the telephone line.

In the example of FIG. 18, the PDA 101 and a digital camera 181 are placed on the connection board 171.

Figure 19:
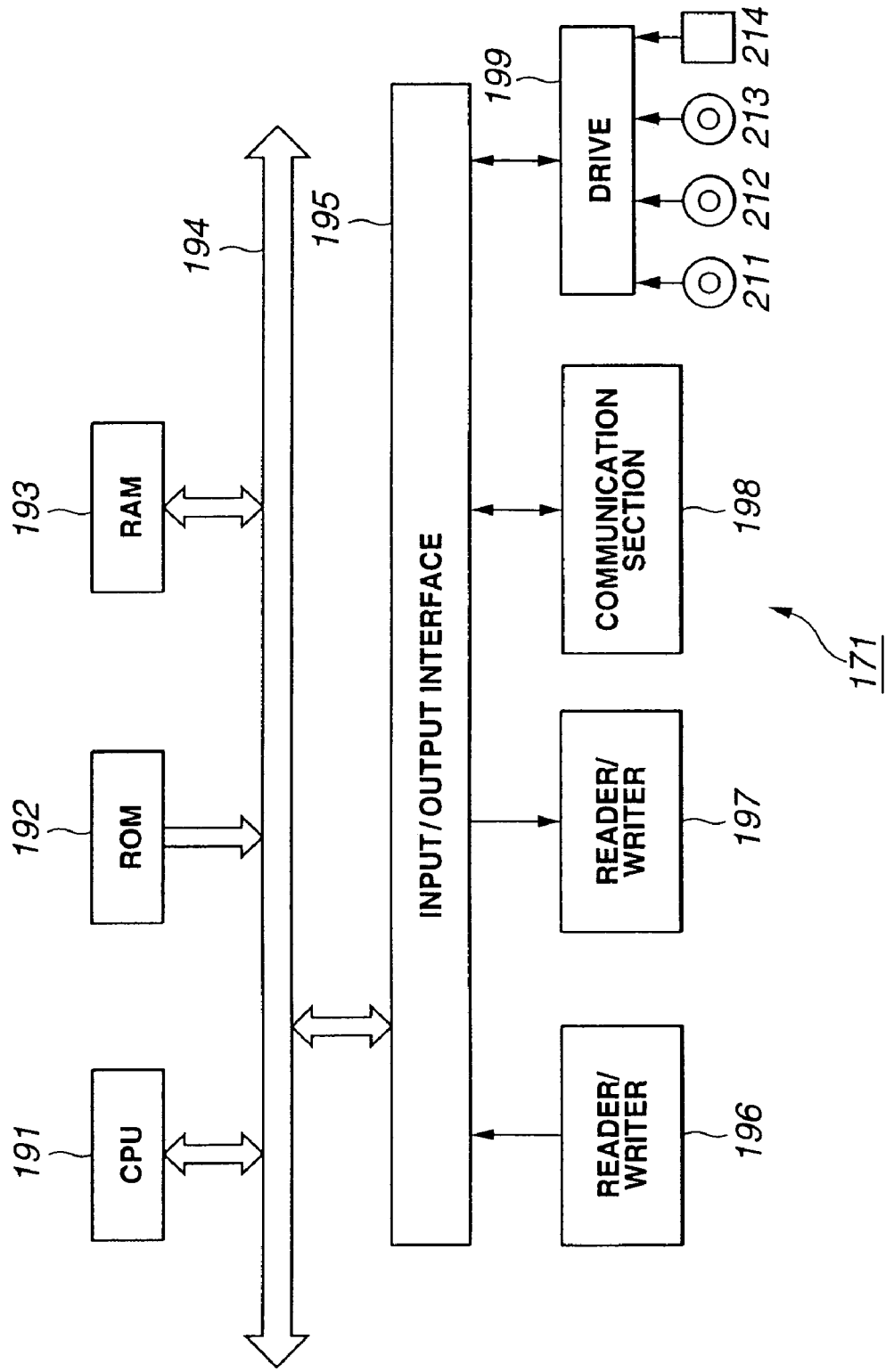
FIG. 19 is a block diagram showing a configuration example of the connection board in FIG. 18.

The connection board 171 is configured as shown in FIG. 19, for example. A CPU 191 through an input/output interface 195 are basically the same as the CPU 21 through the input/output interface 25 in FIG. 2.

Reader/writers 196 and 197 each perform communication between RF tags of two electronic devices. A communication section 198 performs communication between two electronic devices via the telephone line.

A drive 199 is configured to appropriately install a magnetic disc 211, an optical disc 212, a magnet-optical disc 213, semiconductor memory 214, etc. A program stored there is read appropriately and is transferred to RAM 193 for storage.

Figure 20:
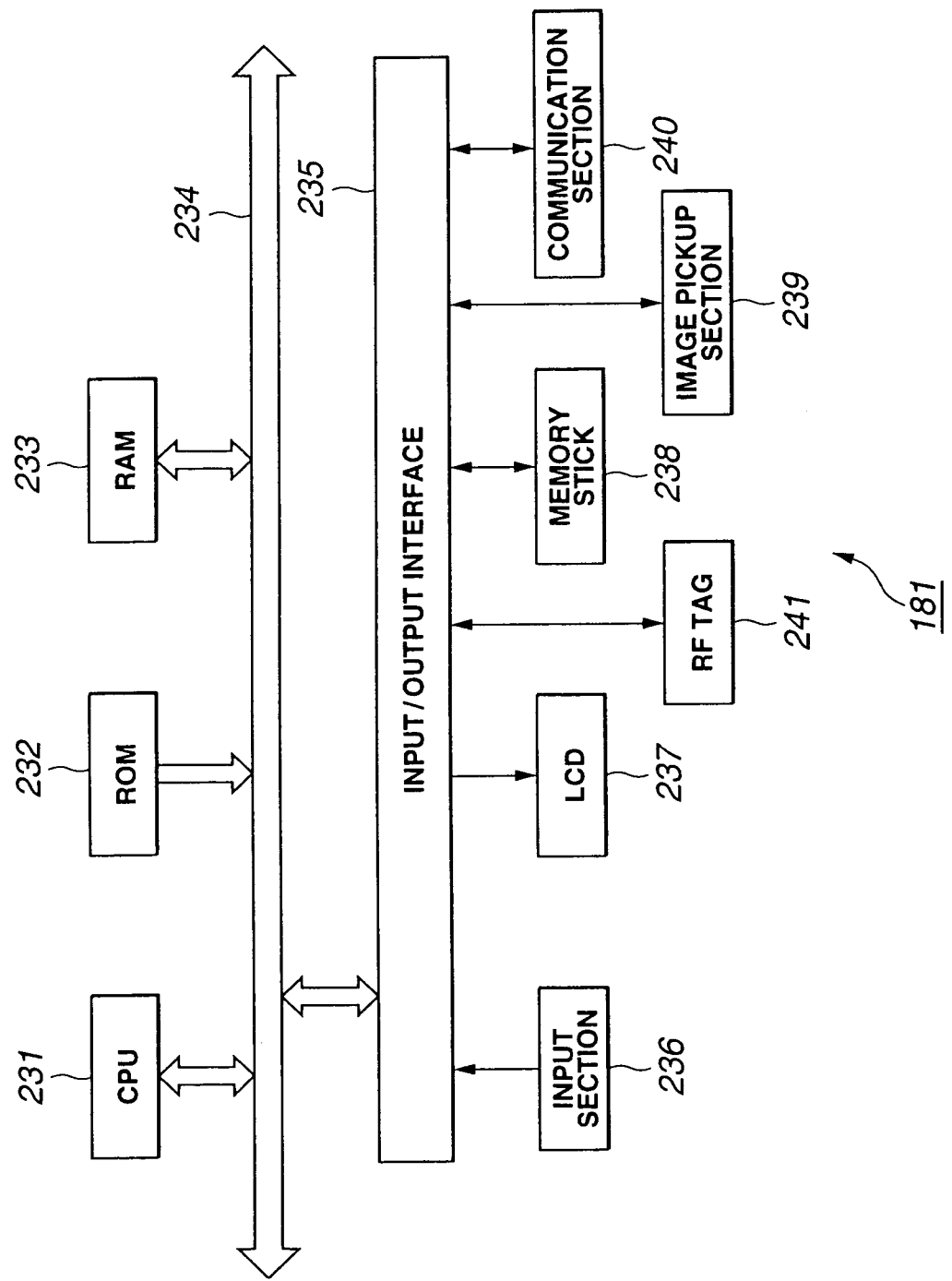
FIG. 20 is a block diagram showing a configuration example of a digital camera in FIG. 18.

FIG. 20 shows an example of an internal configuration of the digital camera 181. A CPU 231 through an input/output interface 235 are basically the same as the CPU 21 through the input/output interface 25 in FIG. 2.

An input section 236 comprises button, switches, etc. and is operated by the user for entering specified instructions. An LCD 237 displays an image captured by an image pickup section 239 or an image stored in a memory stick 238 or RAM 233. The memory slick 238 can be attached or detached from the digital camera 181 and stores images captured by the image pickup section 239. An RF tag 241 internally stores the telephone number as an identification number of the digital camera 181. The RF tag 241 performs communication with the reader/writer 196 of the connection board 171. A communication section 240 provides communication via the telephone line.

Figure 21:
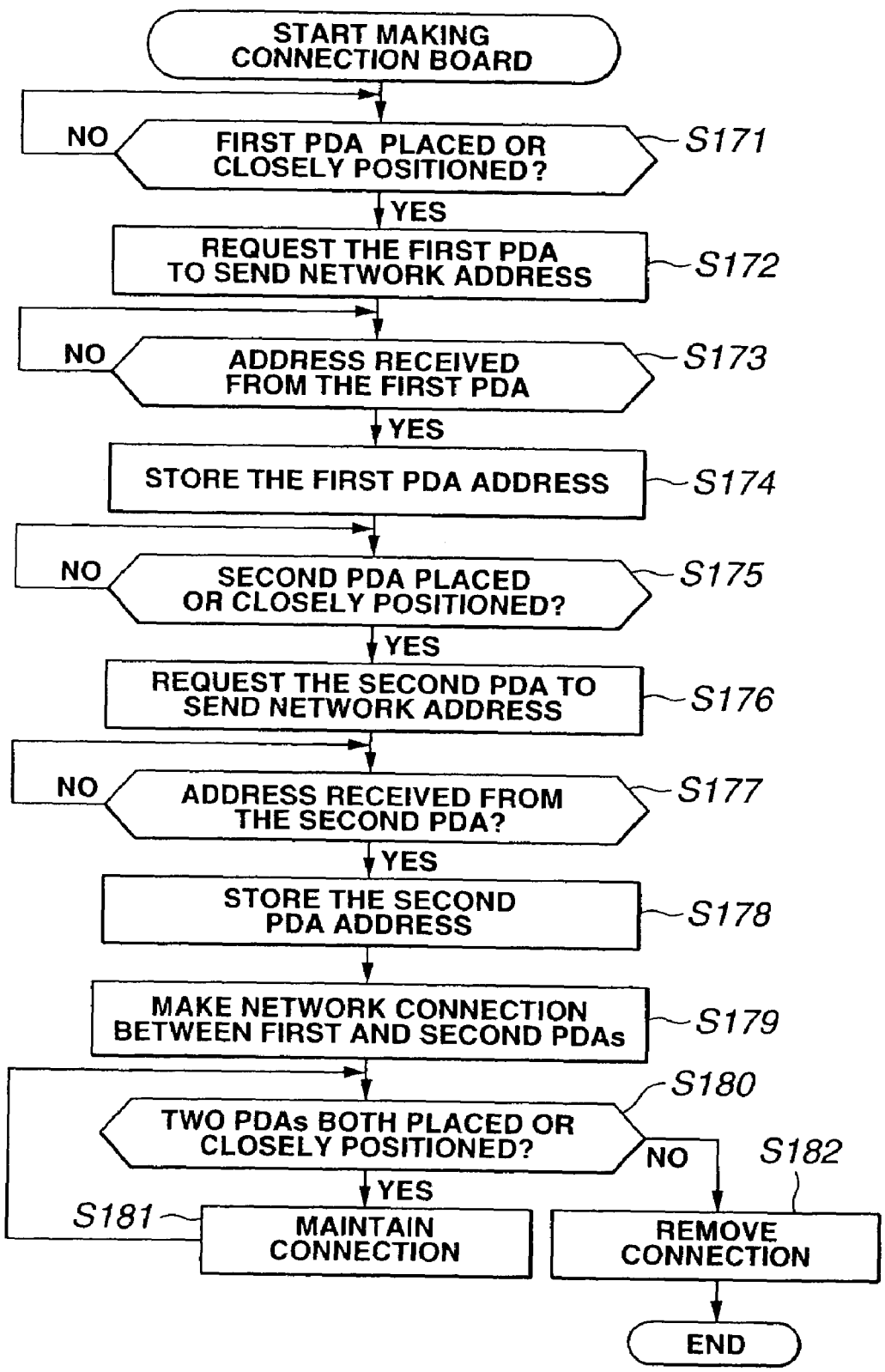
FIG. 21 is a flowchart which shows processes of the connection board in FIG. 18.

First, with reference to the flowchart in FIG. 21, the following describes a process of the connection board 171 for establishing connection when two electronic devices (PDA 101 and digital camera 181 in this case) are placed or moved close to each other on the connection board 171.

At step S171, the CPU 191 of the connection board 171 determines whether or not the first PDA is placed or closely positioned. Namely, it determines whether or not the reader/writer 196 or 197 detects electromagnetic coupling with the electronic device's RF tag. When the first PDA is determined to be placed or closely positioned, the corresponding reader/writer 196 or 197 requests the PDA to send a network address. When the reader/writer 196 detects that the PDA 101 is placed, the reader/writer 196 requests the PDA 101 to send a telephone number. In response to this request, the PDA 101 sends its telephone number. At this time, the PDA 101 performs the same process as that described for the portable telephone 11 according to the flowchart in FIG. 5. At step S173, the CPU 191 of the connection board 171 waits until the telephone number of the PDA 101 is sent via the telephone line. When the telephone number is sent, the CPU 191, at step S174, receives the telephone number of the PDA 101 via the communication section 198 and supplies the telephone number to the RAM 143 for storage.

At steps S175 through 178, the other of the reader/writers 196 and 197 (reader/writer 197 in this case) performs the same process as that for the aforementioned steps S171 through S174.

In this case, the telephone number of the digital camera 181 is read from the RF tag 241 of the digital camera 181. The telephone number is supplied to the RAM 13 of the connection board 171 for storage.

At step S179, the CPU 191 of the connection board 171 establishes telephone line connection between the PDA 101 and the digital camera 181 whose addresses are stored at steps S174 and S178, respectively. This allows the PDA 101 and the digital camera 181 to interchange data with each other via the telephone line.

At step S180, the CPU 191 of the connection board 171 determines whether or not the two PDAs (PDA 101 and digital camera 191) remain being placed or closely positioned. When they remain being placed or closely positioned, the CPU 191 proceeds to step S181 to maintain the connection established at step S179.

The process then returns to step S180. As long as the PDA 101 and the digital camera 181 are placed or closely positioned on the connection board 171, the connection between the PDA 101 and the digital camera 181 is maintained.

When a user removes at least one of the PDA 101 and the digital camera 181 from the connection board 171, it is determined at step S180 that either of the two devices is not placed or closely positioned. The CPU 191 proceeds to step S182 to remove the connection established at step S179. This disables the PDA 101 and the digital camera 181 from communicating with each other via the telephone line subsequently.

Figure 22:
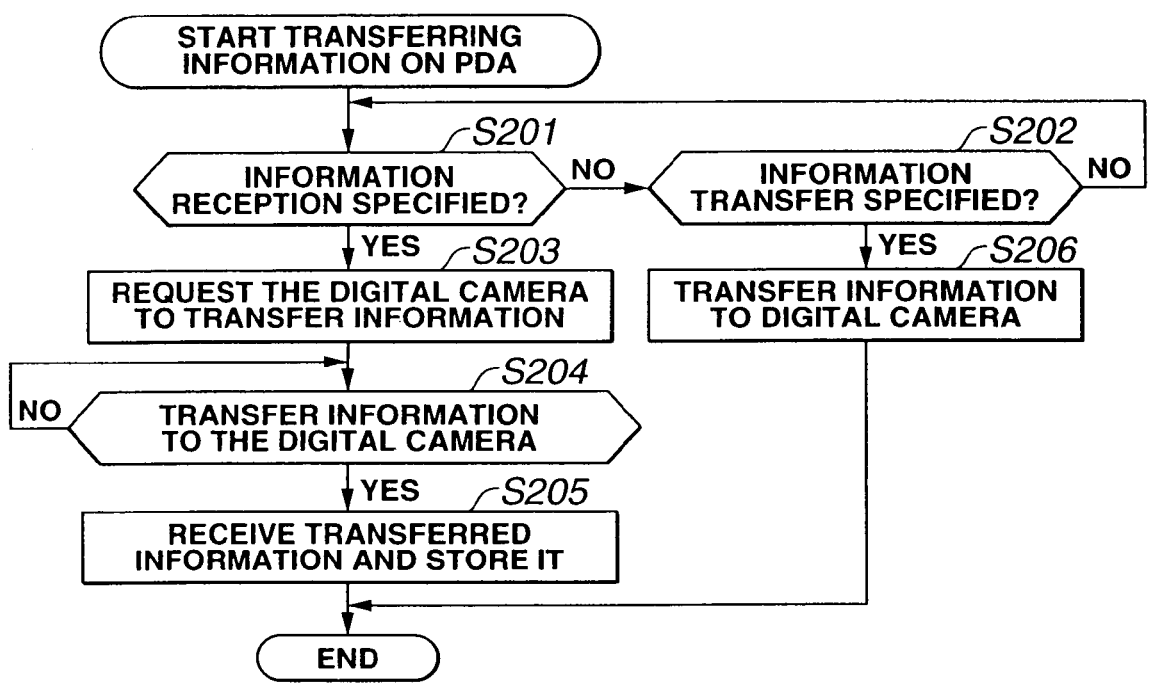
FIG. 22 is a flowchart which shows processes of the PDA in FIG. 18.
Figure 23:
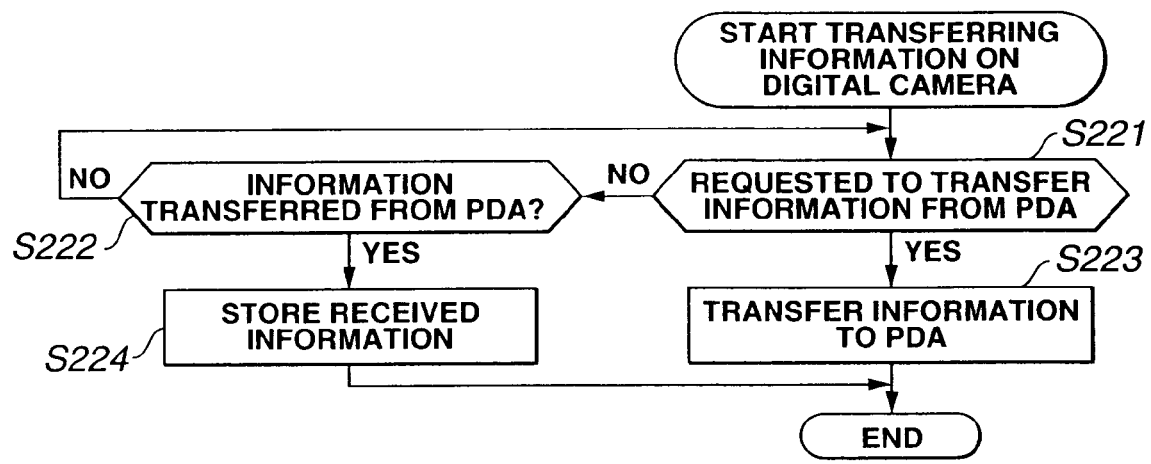
FIG. 23 is a flowchart which shows processes of the digital camera in FIG. 18.

Referring now to flowcharts in FIGS. 22 and 23, the following describes an example of a process between the PDA 101 and the digital camera 181 when they are placed or closely positioned on the connection board 171.

At step S201 in FIG. 22, the CPU 111 of the PDA 101 determines whether or not a user specifies information reception. When not specified, the CPU 111 proceeds to step S202 to determines whether or not information transfer is specified. When information transfer is not specified either, the CPU 111 returns to step S201 and repeatedly performs the subsequent process.

When it is determined at step S202 that the user specifies information transfer, the process proceeds to step S206. The CPU 111 reads data stored in the memory stick 119 and transfers the data to the digital camera 181 from the communication section 120 via the telephone line.

For example, the user may perform an input operation in the direction as indicated by an arrow C in FIG. 18. In this case, the CPU 111 assumes the operation to be an instruction for transferring data from the PDA 101 to the digital camera 181 and performs the aforementioned process.

When it is determined at step S201 that the information reception is specified, the CPU 111 proceeds to step S203 and requests the digital camera 181 to transfer information. As will be described later, the digital camera 181 transfers the information upon reception of this request. At step S204, the CPU 111 waits until the information is transferred. When the information is transferred, the CPU 111, at step S205, uses the communication section 120 to receive the transferred information via the telephone line and supplies this information to the memory stick 119 for storage.

This process is performed when the user operates the pen on the tablet 117 in the direction indicated by an arrow D in FIG. 18, i.e., from the digital camera 181 to the PDA 101.

Referring now to a flowchart in FIG. 23, the following describes a process for the digital camera 181.

At step S221, the CPU 231 of the digital camera 181 determines whether or not a request for information transfer is received from the PDA 101. When no information transfer is requested, the CPU 231 proceeds to step S222 to determine whether or not information is transferred from the PDA 101. When no information is transferred, the CPU 231 returns to step S221 and repeatedly performs the subsequent process.

When it is determined at step S221 that a request for information transfer is received from the PDA, the process proceeds to step S223. The CPU 231 then reads image data stored in the memory stick 238 and transfers the data to the PDA 101 from the communication section 240 via the telephone line.

When it is determined at step S222 that information is transferred from the PDA 101, the process proceeds to step S224. The CPU 231 then supplies the information received at the communication section 240 via the telephone line to the memory stick 238 for storage.

In this example, as mentioned above, two electronic devices can interchange information when they are placed or closely positioned on the connection board 171. A user can intuitively and safely manage information by controlling the security which permits information transfer only between two electronic devices placed on the same plane.

Figure 24:
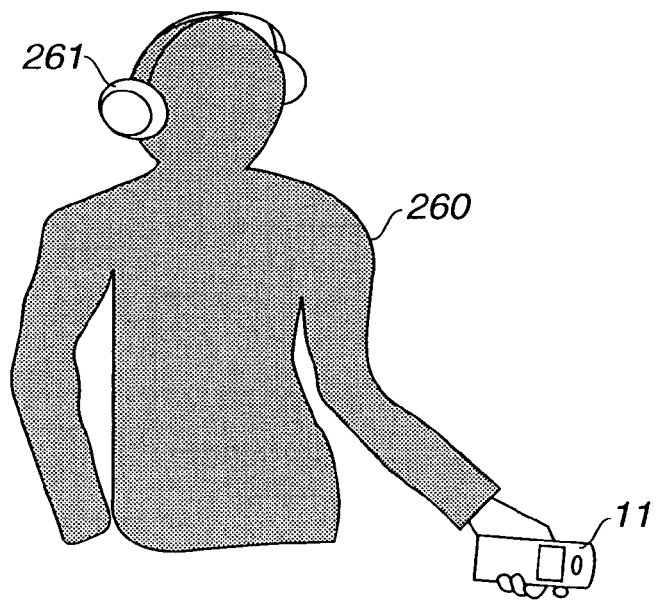
FIG. 24 shows an example of interchanging data between a portable telephone and a headphone.

FIG. 24 shows yet another embodiment. This embodiment interchanges an identification number via a user's human body. In this example, the user wears a headphone 261 on his or her head and holds the portable telephone 11 in his or her hand. The identification number is interchanged between the headphone 261 and the portable telephone 11 via the user's human body 260.

Figure 25:
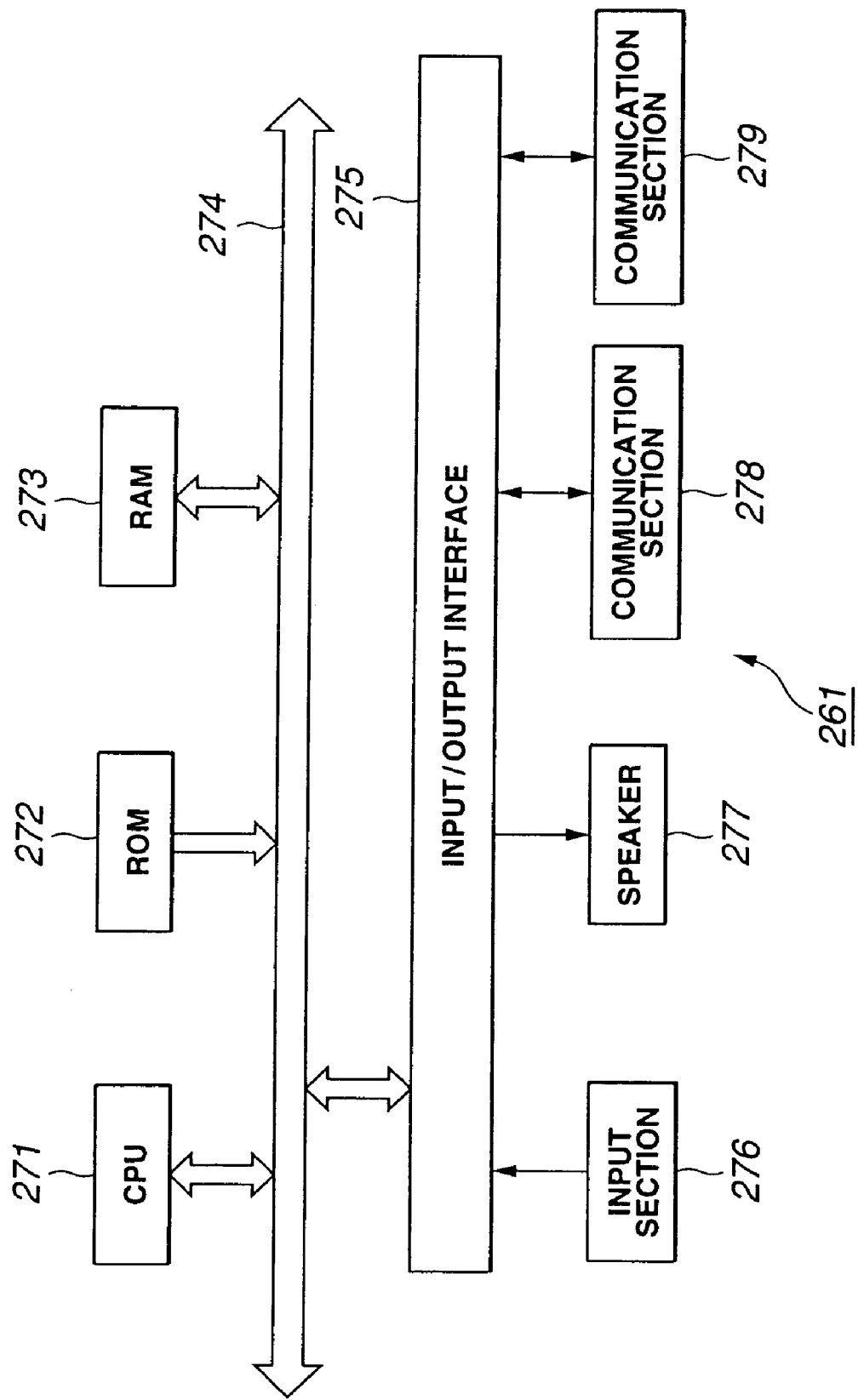
FIG. 25 is a block diagram showing a configuration example of the headphone in FIG. 24.

The headphone 261 is configured as shown in FIG. 25, for example. A CPU 271 through an input/output interface 275 are basically the same as the CPU 21 through the input/output interface 25 in FIG. 2.

An input section 276 is operated by the user to start or stop using the headphone 261. A speaker 277 generates a voice signal received via a communication section 279. A communication section 278 communicates with the portable telephone 11 via the human body 260. The communication section 279 performs wireless communication via the telephone line.

Figure 26:
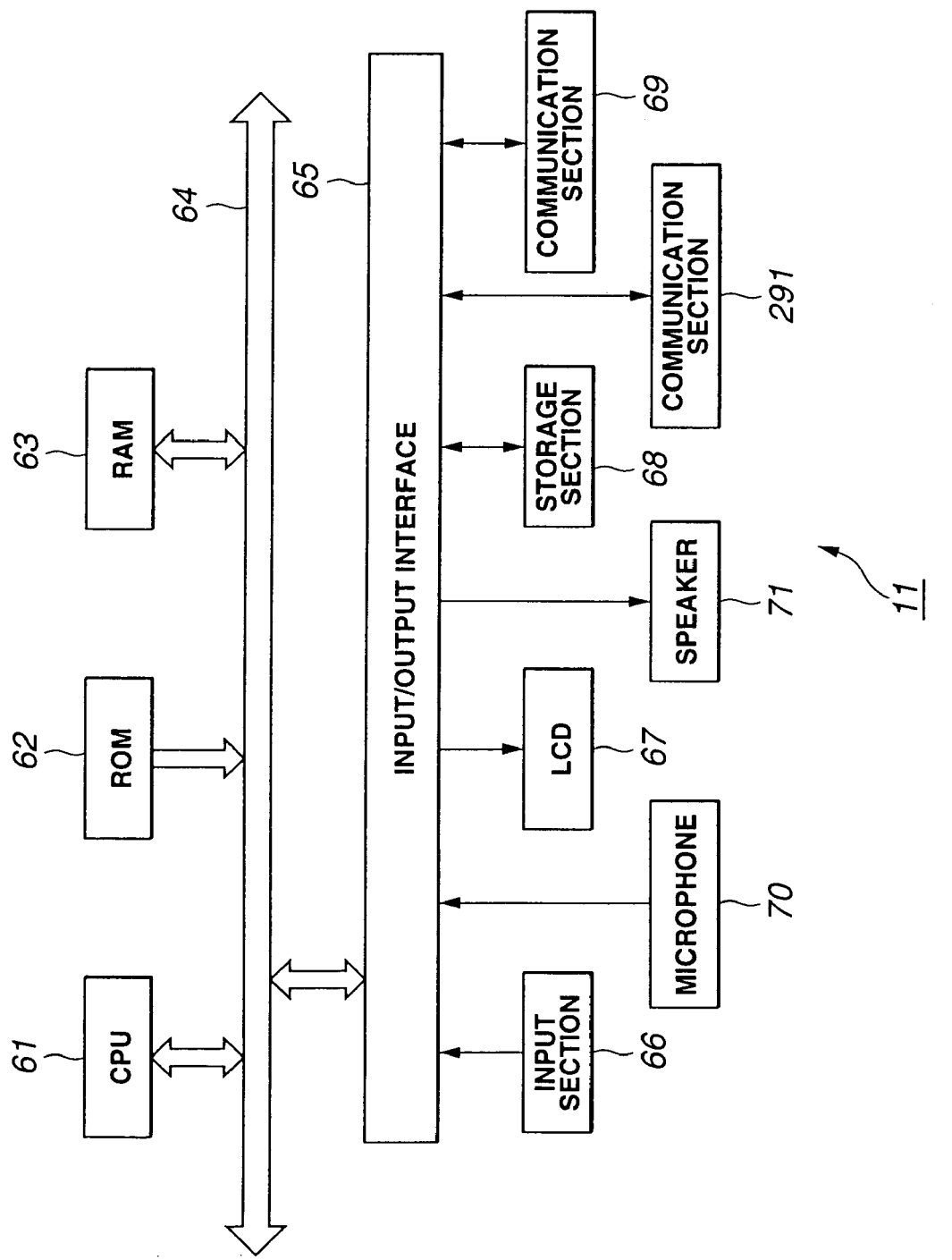
FIG. 26 is a block diagram showing a configuration example of the portable telephone in FIG. 24.

The portable telephone 11 is configured basically the same as shown in FIG. 3. In this example, as shown in FIG. 26, the RF tag 72 in FIG. 3 is replaced by a communication section 291. The communication section 291 communicates with the communication section 278 of the headphone 261 via the human body 260.

Otherwise, the portable telephone 11 is configured the same as shown in FIG. 3.

Figure 27:
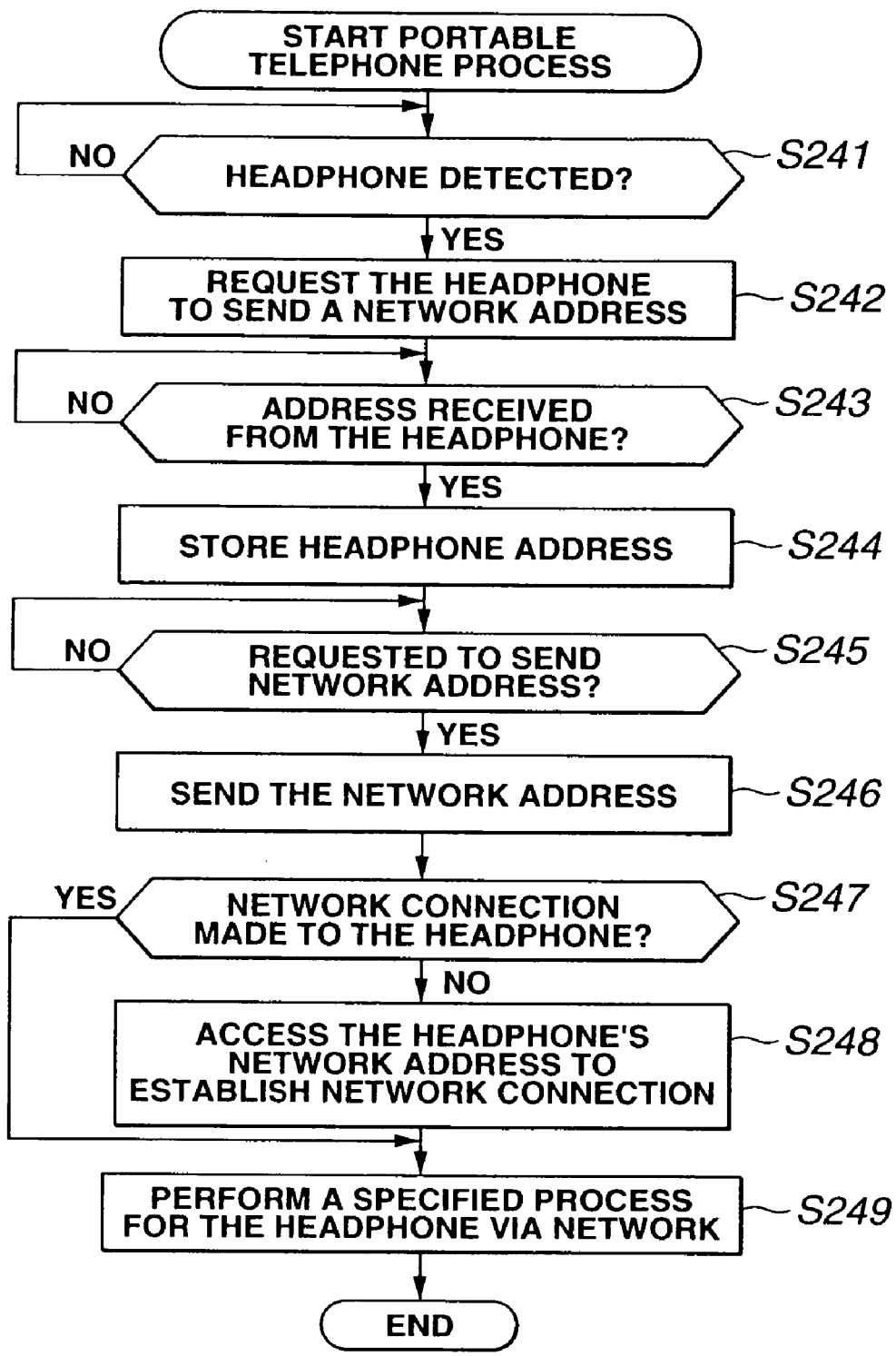
FIG. 27 is a flowchart which shows process of the portable telephone in FIG. 24.

Referring now to a flowchart in FIG. 27, the following describes a process for the portable telephone 11 in the example of FIG. 24.

At step S241, the CPU 61 of the portable telephone 11 determines whether or not the headphone 261 is detected by using the communication section 291 to communicate with the communication section 278 of the headphone 261 via the human body 260. When the headphone 261 is not detected, the CPU 61 waits until it is detected. This detection process is performed in such a manner that the communication section 291 periodically outputs a signal requesting a response and the CPU 61 checks for a response to the request.

When it is determined at step S241 that the headphone 261 is detected (response returned), the process proceeds to step S242. The CPU 61 requests the headphone 261 to send its network address. As will be described later with reference to a flowchart in FIG. 28, the headphone 261 responds to this request and sends its network address at step S266.

At step S243, the CPU 61 of the portable telephone 11 waits until it receives the network address from the headphone 261 via the communication section 291. When receiving that address, the CPU 61 proceeds to step S244 to supply the received network address of the headphone 261 to the storage section 68 for storage. Then proceeding to step S245, the CPU 61 waits until it is requested to send the network address from the headphone 261. When requested, the CPU 61 proceeds to step S246 to send the network address of the portable telephone 11 from the communication section 291 to the headphone 261 via the human body 260. That network address is previously stored in the storage section 68.

At step S247, the CPU 61 determines whether or not a network connection is made to the headphone 261. When a connection is not established yet, the process proceeds to step S248. The CPU 61 accesses the network address of the headphone 261 stored at step S244 to establish a network connection. Specifically, the CPU 61 controls the communication section 69 to generate a call to the telephone number stored at step S244 as a network address of the headphone 261, connecting the telephone line.

When it is determined at step S247 that a connection is already established, the process at step S248 is skipped.

At step S249, the CPU 61 of the portable telephone 11 performs a specified process for the headphone 261 via the telephone line connected by the communication section 69.

Figure 28:
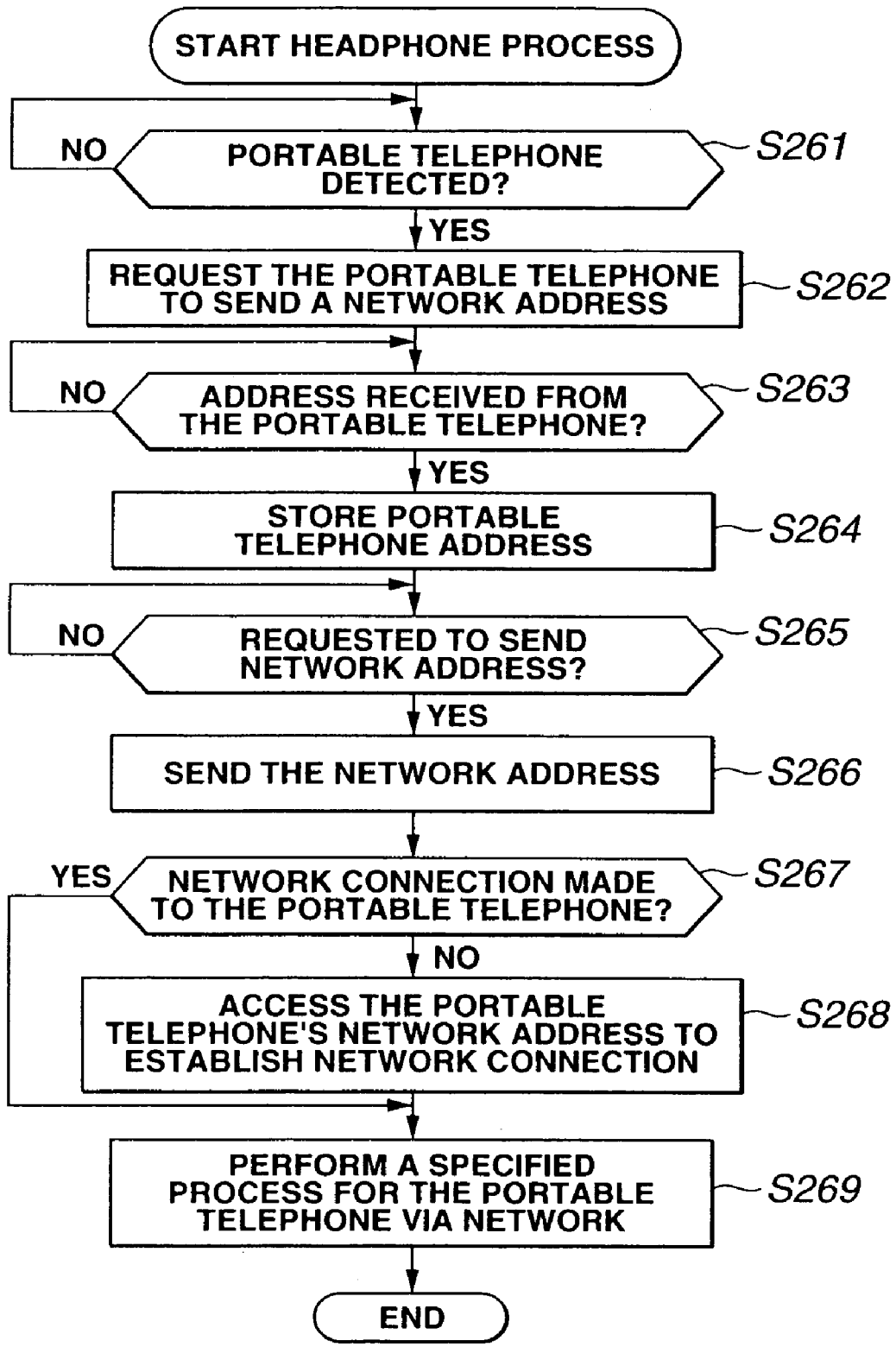
FIG. 28 is a flowchart which shows process of the headphone in FIG. 24.

Corresponding to this operation for the portable telephone 11, the headphone 261 performs a process as shown by a flowchart in FIG. 28. The process at steps S261 through S269 is basically the same as that at steps S241 through S249 for the portable telephone 11 in FIG. 27 except that the target differs.

At step S267, the headphone 261 also determines whether or not a network connection is made to the portable telephone 11. For example, the process at step S268 is skipped when the telephone line is already connected to the portable telephone 11 due to the aforementioned process at step S248 for the portable telephone 11.

In other words, the process at step S248 for the portable telephone 11 is skipped when the telephone line is already connected due to the process on the headphone 261.

In this example, the portable telephone 11 and the headphone 261 each acquire the identification number of the other as mentioned above. Based on the identification number, one makes a connection to the other via the telephone line.

For example, a user, wearing the headphone 261, may use the portable telephone 11 to access a given music distribution server and receive music data. In this case, the distributed music data can be transmitted from the portable telephone 11 to the headphone 261 via the telephone line connected between the portable telephone 11 and the headphone 261. The user can listen to the music using the headphone 261 even if he or she does not hold the portable telephone 11.

Wearing the headphone 261 equipped with a microphone, the user may use the portable telephone 11 to call the other party. When the other party responds, the user can thereafter speak to the other party just by using the headphone 261 without holding the portable telephone 11.

Further, for example, the aforementioned body of the personal computer 1 and a mouse used for it each can be provided with communication sections enabling communication via the user's human body 260. The user interchanges identification numbers between them by touching the mouse and the personal computer body. Based thereon, the telephone line is connected therebetween. Thereafter, the user can send a signal corresponding to a mouse operation to the personal computer by operating the mouse without touching the personal computer body.

Figure 29A:
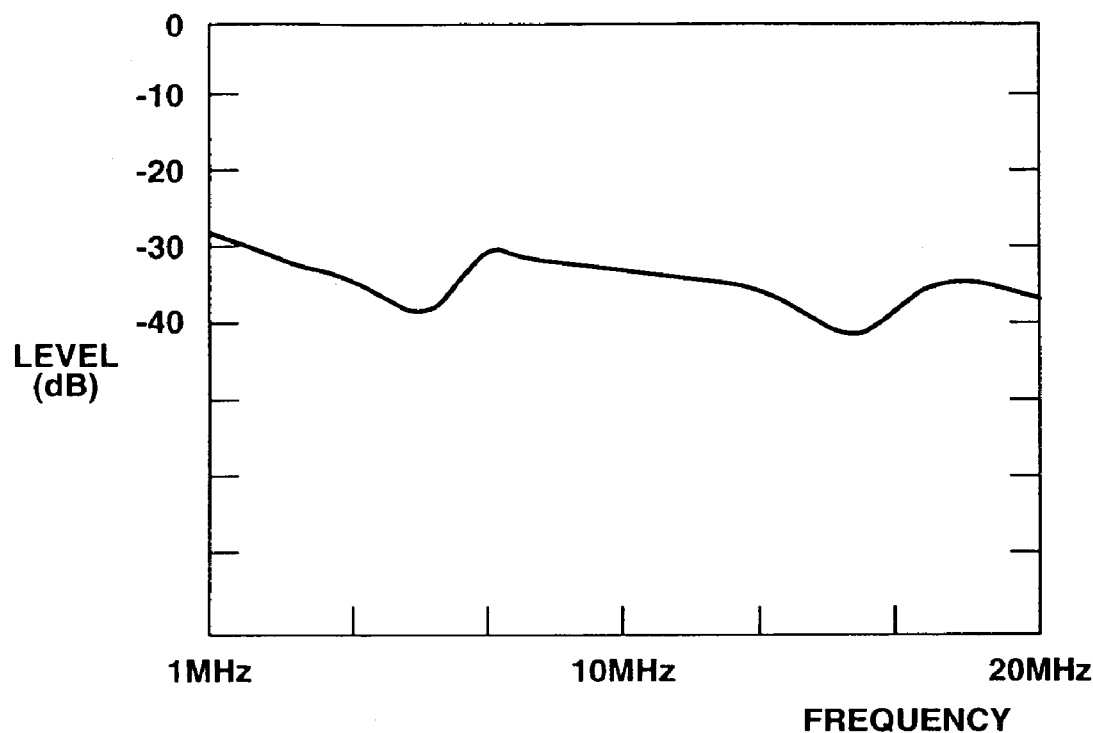
FIGS. 29A and 29B show examples of transfer characteristics of a human body.
Figure 29B:
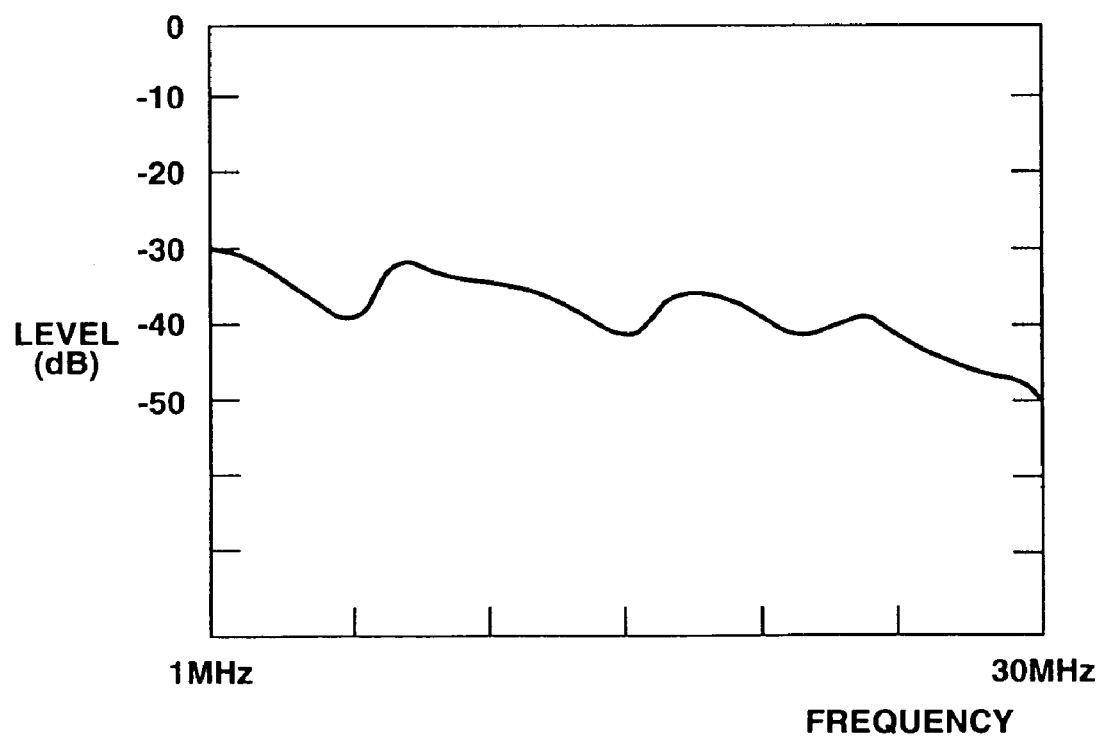

FIG. 29 shows transfer characteristics of a human body. In characteristic charts of FIGS. 29A and 29B, a spectrum analyzer is used to measure transfer characteristics of a human body (between both hands) within the range from 1 to 20 MHz in FIG. 29A and within the range from 1 to 30 MHz in FIG. 29B. In either case, a coaxial cable is connected to a tracking generator and an input terminal. During the experiment, coaxial cable grounds (GND) are connected to each other in order to prevent an antenna effect. FIGS. 29A and 29B show approximately flat transfer characteristics within the range around from 1 to 20 MHz, resulting in the attenuation of 30 through 40 dB.

For the measurement in FIGS. 29A and 29B, the tracking generator's output impedance and the spectrum analyzer's input impedance are both 75Ω. Accordingly, if the impedance between both hands is one megohm from the viewpoint of an alternating current, the attenuation should be at lest −80 dB. Actually, however, the attenuation is very small. It can be understood that this proves a possibility of signal transmission via the human body.

The data transmission side can be considered to be a microdipole antenna. There is fully analyzed the state of an electromagnetic field generated by this antenna. According to such analysis result, an electromagnetic field generated by the human body is equivalent to that generated by the microdipole antenna. The electromagnetic field strength is represented by a vector sum of components which are in inverse proportion to distance R from the antenna, the second power of distance R, and the third power of distance R. These components are respectively referred to as the radiant field, the induction field, and the electrostatic field. Relational expressions for these are described in detail in Japanese Patent Application Laid-Open Publication No. 7-170215.

Figure 30A:
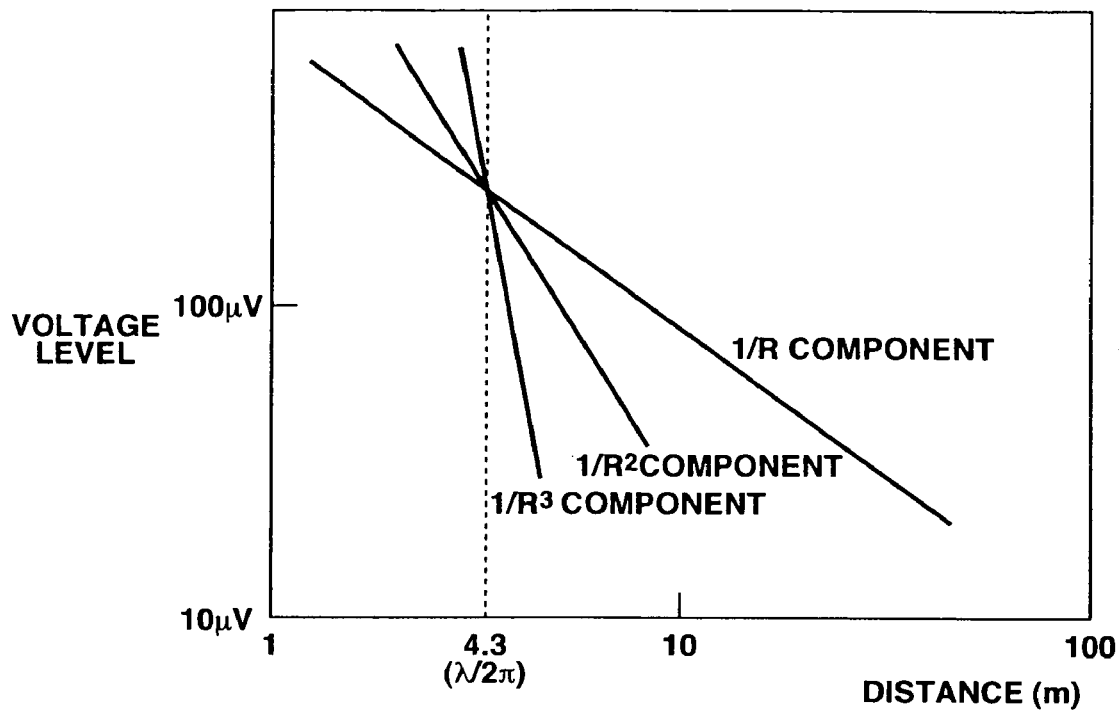
FIGS. 30A and 30B are characteristic charts for explaining the relationship between electric field strength and distance from an antenna.
Figure 30B:
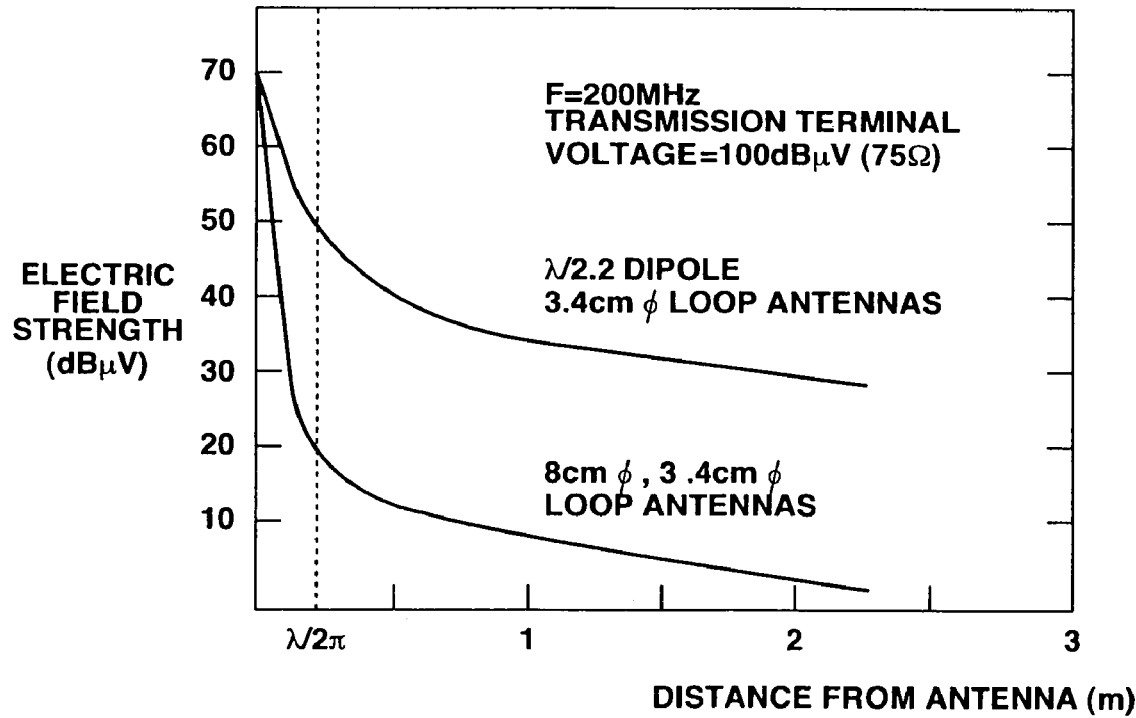

FIGS. 30A and 30B depict electric field strengths. FIG. 30A is a characteristic chart showing the relationship between an electric field strength for each of the aforementioned and a distance from antennas. FIG. 30 B shows electric field strengths and distances for a λ/2.2 dipole antenna and a 3.4 cmφ loop antenna, and 8 cmφ and 3.4 cmφ loop antennas under the conditions of frequency f=200 MHz and a transmission terminal voltage=100 dBμV (75 Ω). As shown in FIGS. 30A and 30B, strengths of the aforementioned radiant field (1/R component), induction field (1/(the second power of R) component), and electrostatic field (1/(the third power of R) component) are equaled for the length of λ/2π. When the distance is smaller than this value, the strengths increase drastically. When f=11 MHz, this distance becomes 4.3 m. Accordingly, it is desirable to adopt a transmission system which mainly uses the electrostatic field.

It is preferable to select a range of electric field strength available under no legal restrictions on the electromagnetic interference (EMI). For example, the frequency should be 332 MHz or less, and the electric field strength should be 500 μV/M or less.

As mentioned above, the electrostatic field attenuates on the basis of the third power of distance R. When the distance changes from 1 m to 3 m, for example, the electric field strength attenuates ¹⁄₂₇(=1/(3×3×3)). Accordingly, the signal strength extremely attenuates as the distance from a data transmission means increases. Even if a plurality of users uses similar apparatuses, it is hardly possible to detect the other users' signals as noises. Under a working condition where there are many users carrying similar apparatuses adjacent to each other, for example, mainly using the electrostatic field enables excellent communication.

The human body 260 touches part of the communication sections 291 and 278 of the portable telephone 11 and the headphone 261. It is desirable to provide a wide area to this contact point. Examples of the contact point include a wrist watch, necklace, ring, bracelet, belt, shoe etc. which can be wound curvedly around a human body's finger, arm, neck, etc. Namely, it is preferable to configure the contact point so that it can touch the human body's skin as widely as possible.

In the aforementioned example, the RF tag and the reader/writer interchange identification numbers. It is also possible to interchange identification numbers by printing a bar code on each electronic device and reading the bar code.

Further, it is possible to use not only the input display section and the notebook computer's palm rest, but also a mouse pad or a white board as information processing apparatuses on which an electronic device should be placed.

The identification number has been explained by using the telephone number as an example but is not limited thereto if it is needed to access the electronic device on the network.

It may be preferable to authenticate the other party by interchanging the identification number.

In the aforementioned description, the telephone line is used as an example of the network. It is also possible to use a LAN, wireless LAN, WAN, Internet, or Bluetooth applicable to various portable devices, etc.

The following describes a communication system which allows the RF tag and the reader/writer to interchange various information and establishes Bluetooth communication based on the obtained information.

This communication system is configured the same as the information processing system in FIG. 1. The personal computer 1 and the portable telephone 11 in FIG. 1 respectively use the reader/writer 33 and the RF lag 72 to send and receive various information and perform Bluetooth communication based on the interchanged information. Namely, a Bluetooth module is built in each of the personal computer 1 and the portable telephone 11.

Figure 31:
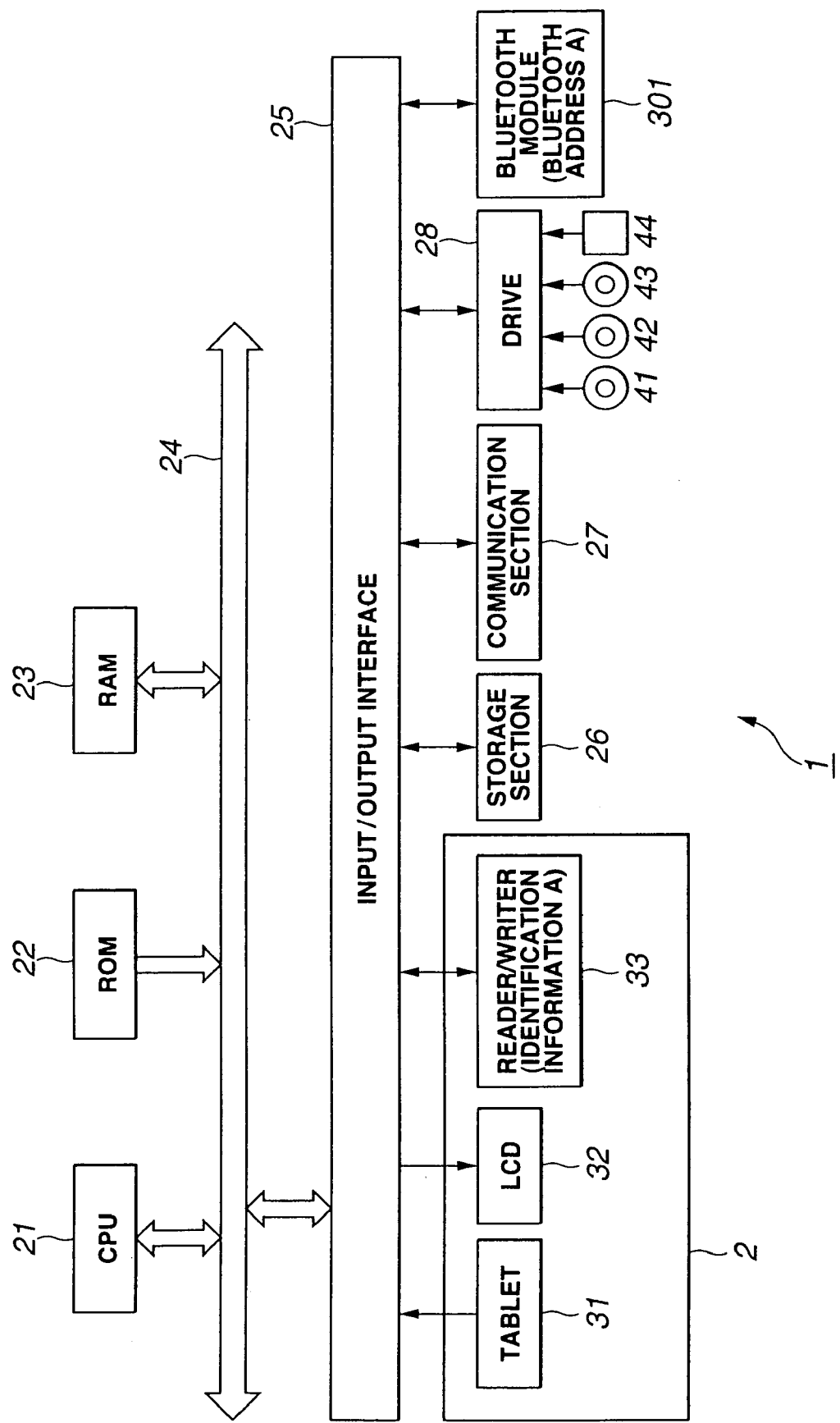
FIG. 31 is a block diagram showing a configuration example of the personal computer in a communication system to which the present invention is applied.

FIG. 31 is a block diagram showing a configuration example of the personal computer 1 containing a Bluetooth module.

The personal computer 1 in FIG. 31 is configured basically the same as the personal computer 1 in FIG. 2 and differs from the latter as follows. First, a Bluetooth module 301 is provided. Second, as will be described later, the reader/writer 33 notifies its identification information to the portable telephone 11 by means of an electromagnetic wave.

The Bluetooth module 301 communicates with a Bluetooth module 311 (see FIG. 32) provided in the portable telephone 11 according to Bluetooth.

Bluetooth is a wireless communication specification standardized by the Bluetooth SIG (Special Interest Group). Bluetooth provides communication with another device provided with a Bluetooth module (appropriately referred to as a Bluetooth device) by using a 2.4 GHz band, i.e., an IMS (Industrial Science Medical) band.

A Bluetooth-based network is called a piconet or a scatternet comprising a plurality of piconets connected with each other according to its form. The network contains Bluetooth devices working as a master and a slave. Hereinafter, a master Bluetooth device is just referred to as a master, and a slave Bluetooth device is just referred to as a slave appropriately.

When the master starts communicating with a slave, the master generates a radio wave at a specified cycle for detecting the slave. When the slave responds accordingly, the master specifies a slave Bluetooth device based on various information sent from the slave and starts communication. Information notified to the master from the slave contains Bluetooth addresses specific to respective Bluetooth devices (modules). Based on a Bluetooth address, the master specifies the slave to communicate with.

Namely, the Bluetooth module 301 in FIG. 31 is also assigned with a specific Bluetooth address which is assumed to be the same as identification information (ID) of the reader/writer 33 in this communication system example. As shown in FIG. 31, the identification information of the reader/writer 33 is defined as identification information A. The address of the Bluetooth module 301 is defined as Bluetooth address A.

Figure 32:
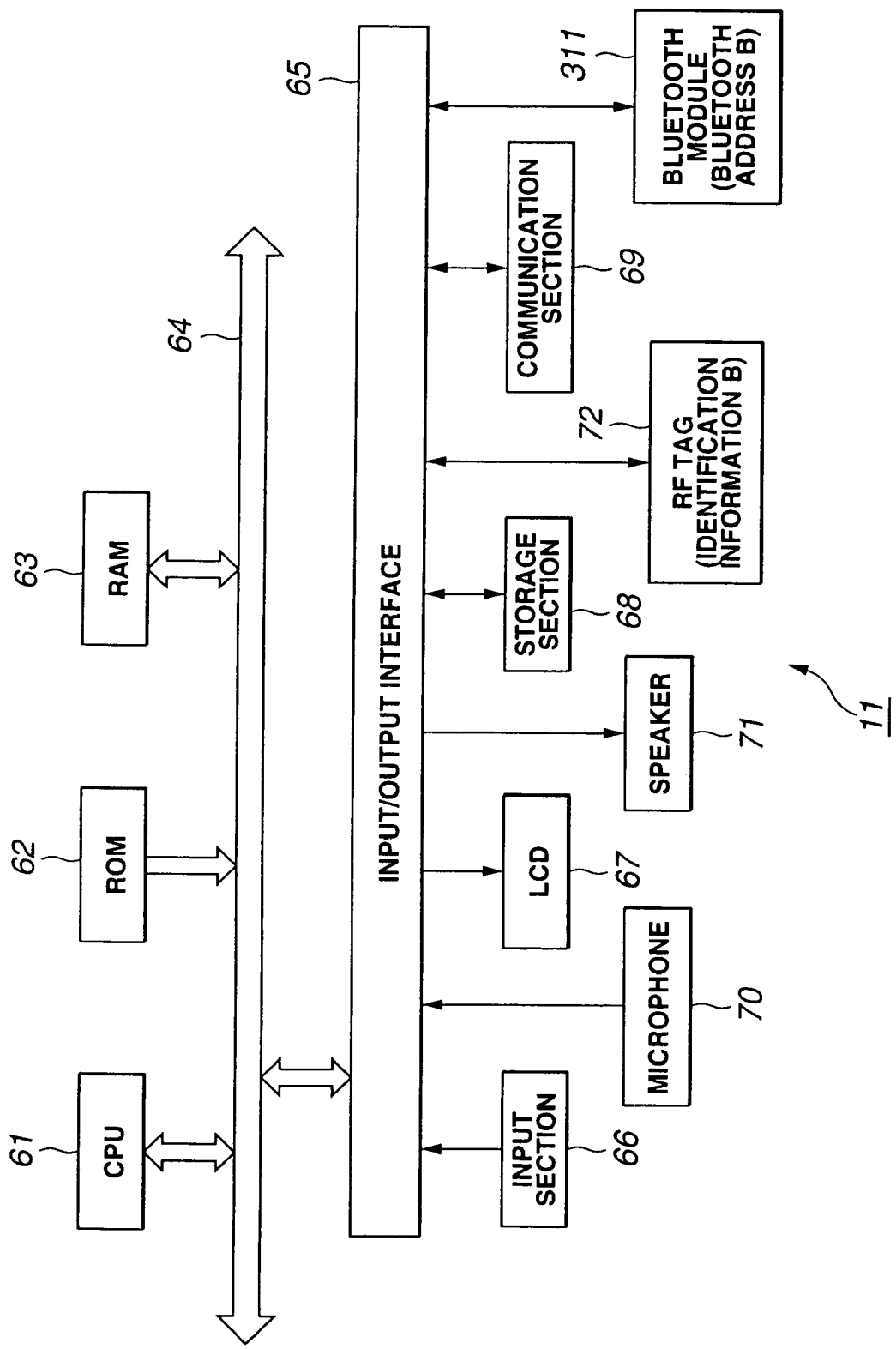
FIG. 32 is a block diagram showing a configuration example of the portable telephone in the communication system to which the present invention is applied.

The portable telephone 11 in FIG. 32 is configured basically the same as the portable telephone 11 in FIG. 3 and differs from the latter as follows. First, a Bluetooth device 311 is provided. Second, the RF tag 72 notifies its identification information, not the telephone number, to the reader/writer 33.

In this portable telephone 11, the identification information of the RF tag 72 is defined as identification information B. The address of the Bluetooth module 311 is defined as Bluelooth address B. The identification information of the RF tag 72 need not always be the same as the address of the Bluelooth module 311. The identification information just needs to include the address.

When receiving an electromagnetic wave generated from the reader/writer 33, the RF tag 72 notifies identification information B accordingly. Based on identification information B obtained by the reader/writer 33, the Bluetooth module 301 of the personal computer 1 searches for a Bluetooth device having the same Bluetooth address (Bluetooth address B) for establishing communication with the Bluetooth module 311 of the portable telephone 11.

Figure 33:
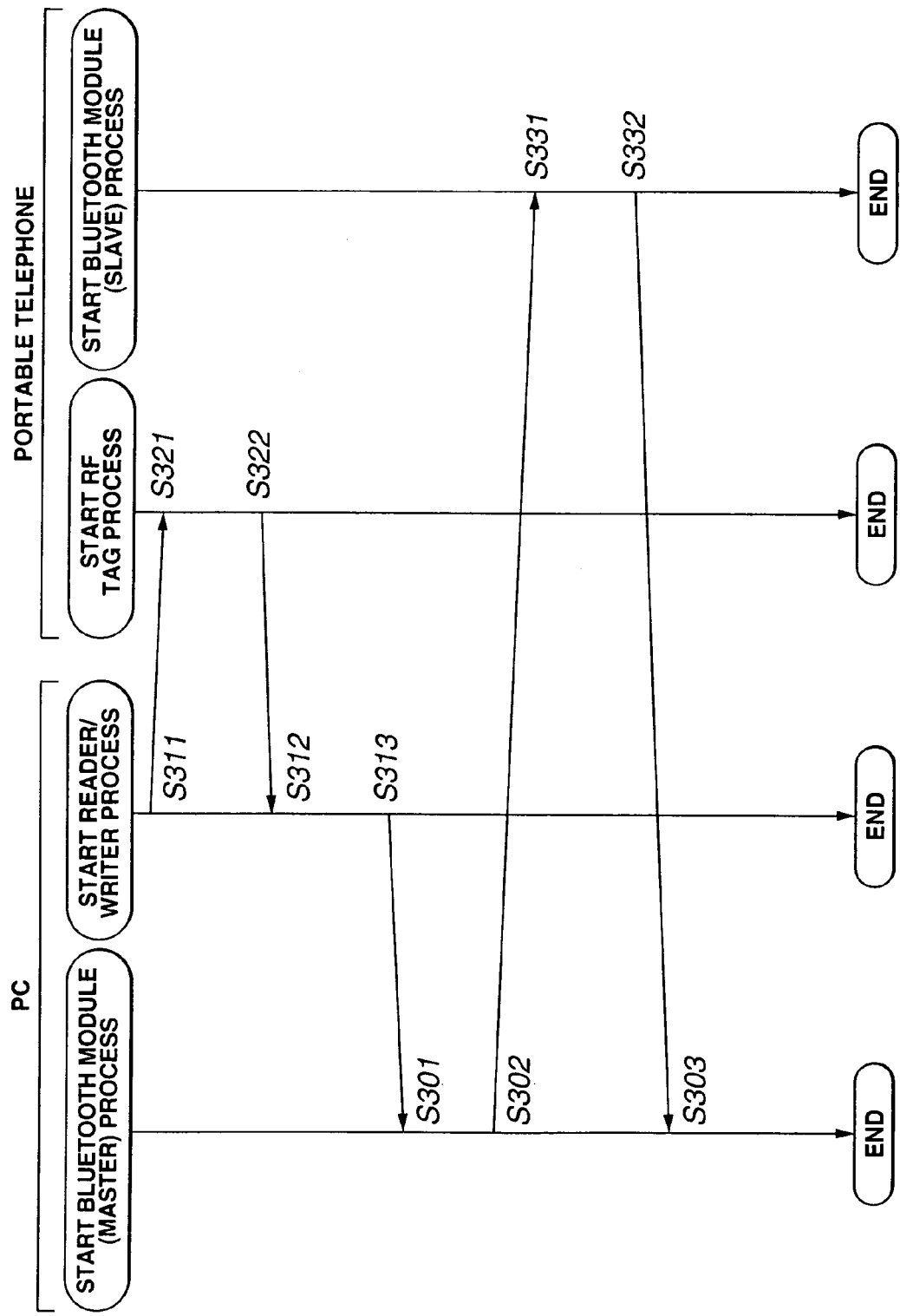
FIG. 33 is a flowchart which shows processes of the communication system to which the present invention is applied.

With reference to a flowchart in FIG. 33, the following describes a process for making communication between the Bluetooth module 301 of the personal computer 1 and the Bluetooth module 311 of the portable telephone 11. In the process of FIG. 33, the personal computer 1 works as a master and the portable telephone 11 as slave. At step S311, the reader/writer 33 generates an electromagnetic wave for detecting terminals provided with RF tags including the portable telephone 11. As described with reference to FIG. 4 etc., this electromagnetic wave is periodically generated at a sufficiently short cycle.

When receiving the electromagnetic wave at step S321, the RF tag 72 of the portable telephone 11 proceeds to step S322 to notify the reader/writer 33 of the predetermined identification information B. This identification information (identification information B) of the RF tag 72 is defined to be the same as the address of the Bluetooth module 311 (Bluetooth address B).

At step S312, the reader/writer 33 receives the identification information (Bluetooth address) notified from the RF tag 72. At step S 313, the reader/writer 33 notifies the received identification information to the Bluetooth module 301 via the input/output interface 25.

At step S301, the Bluetooth module 301 receives the notification from the reader/writer 33. Based on the obtained Bluetooth address, the Bluelooth module 301 proceeds to step S302 to search for a Bluetooth device having the address and request the device for connection (i.e., request to start communication).

At step S331, the Bluetooth module 311 of the portable telephone 11 receives the request from the Bluetooth module 301. The Bluetooth module 311 then proceeds to step S332 to start communication with the personal computer 1 (Bluetooth module 301) as a Bluetooth device.

Specifically, there are performed various processes such as synchronization, authentication, etc. for communication. Then, the communication is made between the personal computer 1 and the portable telephone 11. At steps S303 and S332 and thereafter, various information is sent and received under the Bluetooth environment. In the aforementioned example, the personal computer 1 works as master and the portable telephone 11 as slave. Obviously, both may interchange this master/slave arrangement. When a reader/writer is also provided for the portable telephone 11, the latter detects presence of the personal computer 1. It may be preferable to establish the Bluetooth communication based on the identification information notified from the RF tag of the personal computer 1.

The aforementioned communication system obtains a Bluetooth address by means of communication between the RF tag and the reader/writer and establishes Bluetooth communication based thereon. Such communication system is applicable not only between the personal computer 1 and the portable telephone 11, but also between various devices.

For example, the aforementioned Bluetooth communication is available between a hand-held device such as a portable telephone or a PDA and an apparatus such as a TV set, a vehicle navigation system, an automatic vending machine, or an ATM (automatic teller machine). In this case, the portable telephone and the PDA just need at least a Bluetooth module and an RF tag. The TV set, the vehicle navigation system, the automatic vending machine, and the ATM each just need at least a Bluetooth module and an RF tag's reader/writer.

The present invention is also applicable to communication between portable telephones, between PDAs, between a PDA and a digital camera, between a PDA and a digital video camera, etc. if either of communicating parties has the reader/writer.

In the aforementioned example, the personal computer 1 specifies a device for communication based on the identification information notified from the RF tag 72. Any information may be available as long as if it is identification information unique to the device.

For example, when each device is assigned with 128-bit IPv6 (Internet Protocol version 6) code, the master personal computer 1 can specify a device for communication based on the identification information notified from the RF tag 72.

Software can be used to implement a sequence of the aforementioned processes. In this case, a computer contains special hardware in which programs constituting the software are installed. Alternatively, the software is installed from a network or a recording medium, e.g., in a general-purpose personal computer which can perform diverse functions by installing various programs.

As shown in FIGS. 2 and 19, the recording medium may be configured independently of the apparatus body in the form of a package medium distributed to users for providing programs. Such recording media include the magnetic discs 41 and 211 (including a floppy disc), the optical discs 42 and 212 (including CD-ROM (Compact Disc-Read Only Memory) and DVD (Digital Versatile Disc)), the magnet-optical discs 43 and 213, the semiconductor memory 44 and 214, etc. which record programs. In addition, the recording medium may be pre-installed in the apparatus body to be provided to users in the form of the ROM 22 and 192, a hard disc included in the storage section 26, etc. which record programs.

In the present invention, steps describing a program stored in a recording medium include not only a process which is performed chronologically according to the specified sequence, but also a process which is performed concurrently or individually, not always chronologically.

In the description of the present invention, the system signifies an overall apparatus comprising a plurality of apparatuses.

INDUSTRIAL APPLICABILITY

The present invention obtains identification information about a closely positioned electronic device and communicates with the electronic device via the network based on the identification information. It is possible to easily and reliably interchange data with the electronic device.

Further, the present invention communicates with an information processing apparatus via the network. It is possible to easily and reliably interchange information with the information processing apparatus.

Moreover, the present invention allows the information processing apparatus to obtain identification information of the electronic device when the electronic device is closely positioned over the information processing apparatus. Based on the identification information, communication is made between the electronic device and the information processing apparatus via the network. It is possible to easily and reliably interchange information between the information processing apparatus and the electronic device.

Furthermore, the present invention obtains each identification information of the first and second electronic devices when both are closely positioned. Based on the identification information, communication is made between the first and second electronic devices via the network. It is possible to easily and reliably interchange information between the first and second electronic devices.

The invention claimed is:

1. An information processing apparatus having a communication function, the information processing apparatus comprising:
   a detection means for monitoring a change of impedance of an antenna connected to the information processing apparatus to detect an electronic device actively placed in close proximity to the information processing apparatus, thereby initiating communication with the electronic device;
   request means for requesting that the electronic device send, via a RF communication link, identification information to the information processing apparatus when the detection means detects that the electronic device is closely positioned;
   acquisition means for acquiring identification information from the electronic device via the RF communication link;
   establishing means for establishing a communication link with the electronic device at long distance by using the identification information; and
   communication means for communicating with the electronic device via the communication link.

2. The information processing apparatus according to claim 1, wherein the acquisition means acquires an address for the electronic device as the identification information.

3. The information processing apparatus according to claim 1, wherein the apparatus further comprises a search means for searching for an address for the electronic device based on the identification information obtained by the acquisition means.

4. The information processing apparatus according to claim 1, wherein the apparatus further comprises an execution means for executing a specified process between the information processing apparatus and the electronic device.

5. The information processing apparatus according to claim 4, wherein the execution means sends data to the electronic device or receives data sent from the electronic device.

6. An information processing method of interchanging information, the information processing method comprising the steps of:
   detecting that an electronic device is actively placed in close proximity to an information processing apparatus by monitoring a change of impedance of an antenna, thereby initiating communicating with the electronic device;

requesting that the electronic device send, via a RF communication link, identification information to the information processing apparatus when the electronic device is detected to be closely positioned to the information processing apparatus;

acquiring identification information from the electronic device via the RF communication link;

establishing a communication link between the information processing apparatus and the electronic device at long distance by using the identification information; and communicating with the electronic device via the communication link.

7. A recording medium which records a computer-readable program, the computer-readable program comprising the steps of detecting that an electronic device is actively placed in close proximity to an information processing apparatus by monitoring a change of impedance of an antenna, thereby initiating communication with the electronic device;

requesting that the electronic device send, via a RF communication link, identification information to the information processing apparatus when the electronic device is detected to be closely positioned to the information processing apparatus;

acquiring identification information from the electronic device via the RF communication link;

establishing a communication link between the information processing apparatus and the electronic device at long distance by using the identification information; and communicating with the electronic device via the communication link.

8. An information processing system comprising an information processing apparatus and an electronic device, the electronic device being placed on the information processing apparatus, wherein:

the information processing apparatus comprises:

detection means for monitoring a change of impedance of an antenna connected to the information processing apparatus to detect that the electronic device is actively placed in close proximity to the information processing apparatus, thereby initiating communication with the electronic device;

request means for requesting that the electronic device send, via a RF communication link, identification information to the information processing apparatus when the detection means detects that the electronic device is closely positioned;

acquisition means for acquiring identification information from the electronic device via the RF communication link; and establishing means for establishing a first communication link with the electronic device at long distance by using the identification information;

communication means for communicating with the electronic device via the first communication link, and wherein:

the electronic device comprises:

provision means for providing identification information to the information processing apparatus in response to the requests from the information processing apparatus via the RF communication link when the electronic device is closely positioned to the information processing apparatus;

establishing means for establishing a second communication link with the information processing apparatus at long distance by using the identification information after the first communication link is established; and communication means for communicating with the information processing apparatus after the provision means provides the identification information.

* * * * *